(12) United States Patent
DelMarco

(10) Patent No.: US 9,537,697 B2
(45) Date of Patent: Jan. 3, 2017

(54) CONSTRAINED OPTIMIZATION APPROACH TO COMPANDER DESIGN FOR OFDM PAPR REDUCTION

(71) Applicant: BAE SYSTEMS Information and Electronic Systems Integration Inc., Nashua, NH (US)

(72) Inventor: Stephen P. DelMarco, No. Andover, MA (US)

(73) Assignee: BAE Systems Information and Electronic System Integration Inc., Nashua, NH (US)

( * ) Notice: Subject to any disclaimer, the term of this patent is extended or adjusted under 35 U.S.C. 154(b) by 0 days.

(21) Appl. No.: 14/823,552

(22) Filed: Aug. 11, 2015

(65) Prior Publication Data

US 2016/0050096 A1 Feb. 18, 2016

Related U.S. Application Data

(60) Provisional application No. 62/036,388, filed on Aug. 12, 2014.

(51) Int. Cl.
*H04L 27/28* (2006.01)
*H04L 27/26* (2006.01)

(52) U.S. Cl.
CPC ................ *H04L 27/2615* (2013.01)

(58) Field of Classification Search
CPC .... H04H 40/18; H04L 27/2615; H04W 52/16; H04W 52/42
USPC ........................................................ 375/260
See application file for complete search history.

(56) References Cited

U.S. PATENT DOCUMENTS

2013/0329811 A1* 12/2013 Breiling ................ H04H 20/72
375/240.26
2014/0334421 A1* 11/2014 Sosa ..................... H04L 5/0064
370/329

OTHER PUBLICATIONS

X. Huang, J. Lu, J. Zheng, J. Chuang, and J Gu, "Reduction of Peak-to-Average Power Ratio of OFDM Signals with Companding Transform", Electronic Letters, vol. 37, No. 8, pp. 506-507, Apr. 2001.
X. Wang, T. T. Tjhung, and C. S. Ng, "Reduction of Peak-to-Average Power Ratio of OFDM System Using a Companding Technique", IEEE Trans. Broadcast. vol. 45, No. 3, pp. 303-307, Sep. 1999.
T. G. Pratt, N. Jones, L. Smee, and M. Torrey, "OFDM Link Performance with Companding for PAPR Reduction in the Presence of Non-linear Amplification", IEEE Trans. Broadcast., vol. 52, No. 2, pp. 261-267, Jun. 2006.
X. Wang, T. T. Tjhung, C. S. Ng, and A. A. Kassim, "On the SER Analysis of A-Law Companded OFDM System", Proc. IEEE GLOBECOM, vol. 2, pp. 756-760, 2000.
Y. Wang, L.-H. Wang, J.-H. Ge, and B. Ai, "Nonlinear Companding Transform Technique for Reducing PAPR of OFDM Signals", IEEE Trans. Consumer Elec., vol. 58, No. 3, pp. 752-757, Aug. 2012.

(Continued)

*Primary Examiner* — David S Huang
(74) *Attorney, Agent, or Firm* — Maine Cernota & Rardin; Daniel J. Long; Scott J. Asmus

(57) ABSTRACT

In the method for constrained optimization for compander design for OFDM PAPR, wherein the improvement comprises the step of converting a Rayleigh amplitude distribution from which superior performing companders are derived, whereby a constrained optimization problem may be solved using Lagrange multipliers.

18 Claims, 19 Drawing Sheets

(56) References Cited

OTHER PUBLICATIONS

Y. Rahmatallah, N. Bouaynaya, and S. Mohan, "Bit Error Rate Performance of Linear Companding Transforms for PAPR Reduction in OFDM Systems", Proc. IEEE GLOBECOM, pp. 1-5, 2011.
S. A. Aburakhia, E. F. Badran, and D. A. E. Mohamed, Linear Companding Transform for the Reduction of Peak-to-Average Power Ratio of OFDM Signals, IEEE Trans. Broadcast., vol. 55, No. 1, pp. 155-160, Mar. 2009.
X. Huang, J. Lu, J. Zheng, K.B. Letaief, and J. Gu., Companding Transform for Reduction in Peak-to-Average Power Ratio of OFDM Signals, IEEE Trans. Wireless Comm., vol. 3, No. 6, pp. 2030-2039, Nov. 2004.
C.-L. Wang, and S.-J. Ku, "A Low-Complexity Companding Transform for Peak-to-Average Power Ratio Reduction in OFDM Systems", Proc. IEEE ICASSP, vol. IV, pp. 329-332, 2006.
P. Yang, A. Hu, "Two-Piecewise Companding Transform for PAPR Reduction of OFDM Signals", Proc.7th Int'l Conf. Nireless Comm. And Mobile Computing (IWCMC), pp. 619-623, 2011.
V. Tabatabavakili, and A. Zahedi, "Reduction of Peak-to-Average Power Ratio of OFDM Signals Using a New Continuous Linear Companding Transform", Proc. IEEE Int'l Symp. Telecom., pp. 426-430, 2010.
T. Jiang, W. Xiang, P. C. Richardson, D. Qu, and G. Zhu, "On the Nonlinear Companding Transform for Reduction in PAPR of MCM Signals", IEEE Trans. Wireless Comm., vol. 6, No. 6, pp. 2017-2021, Jun. 2007.
T. Jiang, W. Yao, P. Guo, Y. Song, and D. Qu, "Two Novel Nonlinear Companding Schemes with Iterative Receiver to Reduce PAPR in Multi-Carrier Modulation Systems", IEEE Trans. Broadcast., vol. 52, No. 2, pp. 268-273, Jun. 2006.
T. Jiang, Y. Yang, and Y.-H Song, "Exponential Companding Technique for PAPR Reduction in OFDM Systems", IEEE Trans. Broadcast., vol. 51, No. 2, pp. 244-248, Jun. 2005.
T. Jiang., and G. Zhu, "Nonlinear Companding Transform for Reducing Peak-to-Average Power ratio of OFDM Signals", IEEE Trans. Broadcast., vol. 50, No. 3, pp. 342-346, Sep. 2004.
N.S.L. Phani Kumar, A. Banerjee, and P. Sircar, "Modified Exponential Companding for PAPR Reduction of OFDM Signals", Proc. Wireless Comm. and Network. Conf (WCNC), pp. 1344-1349, 2007.
S.-S. Jeng, and J.-M. Chen, "Efficient PAPR Reduction in OFDM Systems Based on a Companding Technique with Trapezium Distribution", IEEE Trans. Broadcast., vol. 57, No. 2, pp. 291-298, Jun. 2011.
J. Hou, J.H. Ge, and J Li, "Trapezoidal Companding Scheme for Peak-to-Average Power Ratio Reduction of OFDM Signals", Electronic Letters, vol. 45, No. 25, pp. 1349-1351, Dec. 2009.
J. Hou, J. Ge, D. Zhai, and J. Li, "Peak-to-Average Power Ratio Reduction of OFDM Signals with Nonlinear Companding Scheme", IEEE Trans. Broadcast., vol. 56, no. 2, pp. 258-262, Jun. 2010.
Y. Wang, L.-H. Wang, J.-H. Ge, and B. Ai., "An Efficient Nonlinear Companding Transform for Reducing PAPR of OFDM Signals", IEEE Trans. Broadcast., vol. 58, No. 4, pp. 677-684, Dec. 2012.
S: DelMarco, "General Closed-Form Family of Companders for PAPR Reduction in OFDM Signals Using Amplitude Distribution Modification", Accepted to IEEE Trans. Broadcast., 2014.
Y. Wang, J.-H. Ge, L.-H. Wang. J. Li,and B. Ai., "Nonlinear Companding Transform for Reduction of Peak-to-Average Power ratio in OFDM Systems", IEEE Trans. Broadcast, vol. 59, No. 2, pp. 369-375, Jun. 2013.
D. G. Luenberger, and Y. Ye, Linear and Nonlinear Programming, New York: Springer, 2008.

\* cited by examiner

CONSTRAINED OPTIMIZATION APPROACH TO COMPANDER DESIGN FOR OFDM PAPR REDUCTION

RELATED APPLICATIONS

This application claims the benefit of U.S. Provisional Application No. 62/036,388, filed Aug. 12, 2014. This application is herein incorporated by reference in its entirety for all purposes.

FIELD OF THE INVENTION

The invention relates to signal processing and, more particularly, to companders for reducing peak to average power ratio (PAPR) in orthogonal frequency division multiplexing (OFDM) signals.

BACKGROUND OF THE INVENTION

Orthogonal frequency-division multiplexing (OFDM) is a method of encoding digital data on multiple carrier frequencies. OFDM has developed into a popular scheme for wideband digital communication, used in applications such as digital television and audio broadcasting, DSL Internet access, wireless networks, powerline networks, and 4G mobile communications.

For a sufficiently large number of tones, OFDM signal values are Gaussian, or normally, distributed, by the central limit theorem, which states that, given certain conditions, the arithmetic mean of a sufficiently large number of iterates of independent random variables, each with a well-defined expected value and well-defined variance, will be approximately normally distributed, regardless of the underlying distribution.

The Gaussian distributed signal components generate Rayleigh distributed signal amplitude values, Rayleigh distributions being continuous probability distributions for positive-valued random variables, specifically the distribution of the magnitude of a two-dimensional random vector whose coordinates are independent, identically distributed, mean 0 normal variables. In signals typical of the current state of the art, the Rayleigh distribution is typically heavy-tailed, i.e. a larger proportion of its population rests within its tail than would under a normal distribution. The long tail of the Rayleigh distribution, i.e. the portion of the distribution having a large number of occurrences far from the "head" or central part of the distribution, indicates the presence of large amplitude values, resulting from constructive interference. These large amplitude values can saturate the power amplifier, used in the processing chain, thus creating signal distortion which reduces demodulation performance.

This causes existing techniques for Orthogonal Frequency-Division Multiplexing (OFDM) to suffer from large peak-to-average power ratio (PAPR). The PAPR is the peak amplitude squared (giving the peak power) divided by the mean square value squared (giving the average power).

Many techniques have been developed to mitigate the PAPR problem, including signal companding. Companders are attractive because of their simplicity and effectiveness. Companders apply an amplitude weight to the signal, generally downweighting large amplitude values, while upweighting smaller values to maintain constant power. The large amplitude downweighting, while simultaneously maintaining the same power level, reduces the PAPR. The amplitude weighting introduces signal distortion, so it is important to design companders that introduce minimal distortion to limit demodulation errors, while also providing out-of-band power rejection.

Early solutions adapted companders from speech and audio coding, such as μ-law and A-law companders. Subsequent approaches decomposed the amplitude interval into disjoint regions over which different amplitude weighting functions were used. Modern companders are derived by transforming the Rayleigh amplitude distribution into a more favorable distribution to reduce PAPR. Among these transformations, piecewise transformations, i.e. a function composed of straight-line sections, have been used, either uniform, linear, nonlinear, or piecewise linear.

A need still exists, however, for solutions which minimally alter the original Rayleigh amplitude distribution.

SUMMARY OF THE INVENTION

One embodiment of the present invention provides a signal transmitting apparatus for an orthogonal frequency division multiplexing (OFDM) system, comprising: a compander configured to compress and expand a transmitted signal wherein the compander comprises a Rayleigh amplitude distribution to a constrained optimization problem which may be solved using Lagrange multipliers.

One embodiment of the present invention provides a signal transmitting apparatus for orthogonal frequency division multiplexing (OFDM) system, comprising: a companding feedback module configured to compress and expand a transmitted signal; wherein the companding feedback module comprises a Rayleigh amplitude distribution to a constrained optimization problem which may be solved using Lagrange multipliers.

One embodiment of the present invention provides a method of deriving a compander for orthogonal frequency division multiplexing comprising: converting a Rayleigh amplitude distribution to a constrained optimization problem which may be solved using Lagrange multipliers.

Another embodiment of the present invention provides such a method wherein the Rayleigh amplitude distribution is decomposed into disjoint regions over which a plurality of amplitude weighting functions are used.

A further embodiment of the present invention provides such a method wherein the constrained optimization approach comprises optimizing an objective function with respect to changeable elements in the presence of constraints on those elements.

Yet another embodiment of the present invention provides such a method wherein the Rayleigh amplitude distribution is a probability distribution function and a first the constraint is that the Rayleigh amplitude distribution must integrate to unity.

A yet further embodiment of the present invention provides such a method wherein a second the constraint is that power must be constant across the distribution.

Still another embodiment of the present invention provides such a method wherein an optimal solution is minimally perturbed to generate only non-negative solutions.

A still further embodiment of the present invention provides such a method of claim 5 wherein the Rayleigh amplitude distribution is defined as:

$$f_R(x) = \frac{2x}{\sigma^2} e^{-\frac{x^2}{\sigma^2}}.$$

Even another embodiment of the present invention provides such a method wherein further comprising determining a function g(x) which minimizes:

$$\int_0^A (f_R(x) - g(x))^2 dx.$$

An even further embodiment of the present invention provides such a method wherein g(x) is chosen to be of piecewise linear form.

A still even another embodiment of the present invention provides such a method wherein g(x) is defined as $$g(x) = \sum_{i=1}^{N} U_i(x).$$

A still even further embodiment of the present invention provides such a method wherein the dynamics of the system are defined as: $\Lambda(\beta_1, \ldots \beta_{N+1}, \lambda_1, \lambda_2) = F(\beta_1, \ldots \beta_{N+1}) + \lambda_1 [g_1(\beta_1, \ldots \beta_{N+1}) - 1] + \lambda_2 [g_2(\beta_1, \ldots \beta_{N+1}) - \sigma^2]$.

Still yet another embodiment of the present invention provides such a method wherein a first constraint, that the cumulative distribution function must integrate to unity, is expressed as: $g_1(\beta_1, \ldots \beta_{N+1}) = 1$.

A still yet further embodiment of the present invention provides such a method wherein a second constraint, that power must be constant, is expressed as: $g_2(\beta_1, \ldots \beta_{N+1}) = \sigma^2$.

Even yet another embodiment of the present invention provides such a method wherein the constrained optimization problem can be defined as: Minimize:

$$F(\beta_1, \ldots \beta_{N+1}) = \int_0^A (f_R(x) - g(x))^2 dx$$

for $\beta_i$, subject to $$\int_0^A g(x)dx = 1 \text{ and } \int_0^A x^2 g(x) dx = \int_0^\infty x^2 f_R(x) dx = \sigma^2,$$

using Lagrange multipliers.

An even yet further embodiment of the present invention provides such a method wherein the compander is defined as:

$$F_{|y|}^{-1} F_R(x) = \pm \sqrt{\frac{1 - e^{-\frac{x^2}{\sigma^2}} - Z_{i-1}}{\gamma} - \left(\frac{e}{\gamma} - \frac{\delta^2}{4\gamma^2}\right)} - \frac{\delta}{2\gamma}$$

for $a_i \leq x < a_{i+1}$, wherein $$Z_i = Z_{i-1} + \frac{\beta_{i+1}(a_{i+1} - a_i) + \beta_i(a_{i+1} - a_i)}{2}.$$

Still even yet another embodiment of the present invention provides such a method wherein a decompander for use with the compander is defined as:

$$x = \text{sgn}(x) \sqrt{-\sigma^2 \ln\left(-\gamma\left(y + \frac{\delta}{2\gamma}\right)^2 - e + \frac{\delta^2}{4\gamma^2} + 1 - Z_{i-1}\right)},$$

where the sgn function refers to retaining either the positive or negative square-root, depending on the sign of x; and wherein the range of the compander, when $a_i \leq x < a_{i+1}$, then $y_{MIN} \leq y < y_{MAX}$ where: $y_{MIN} = \min\{y(a_i), y(a_{i+1})\}$, $y_{MAX} = \max\{y(a_i), y(a_{i+1})\}$, can be defined as $$y(a_{i+1}) = \pm \sqrt{\frac{1 - e^{-\frac{a_{i+1}^2}{\sigma^2}} - Z_{i-1}}{\gamma} - \left(\frac{e}{\gamma} - \frac{\delta^2}{4\gamma^2}\right)} - \frac{\delta}{2\gamma}.$$

A still even yet further embodiment of the present invention provides such a method wherein a Hessian Matrix is used to determine critical point types.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Figure 1:
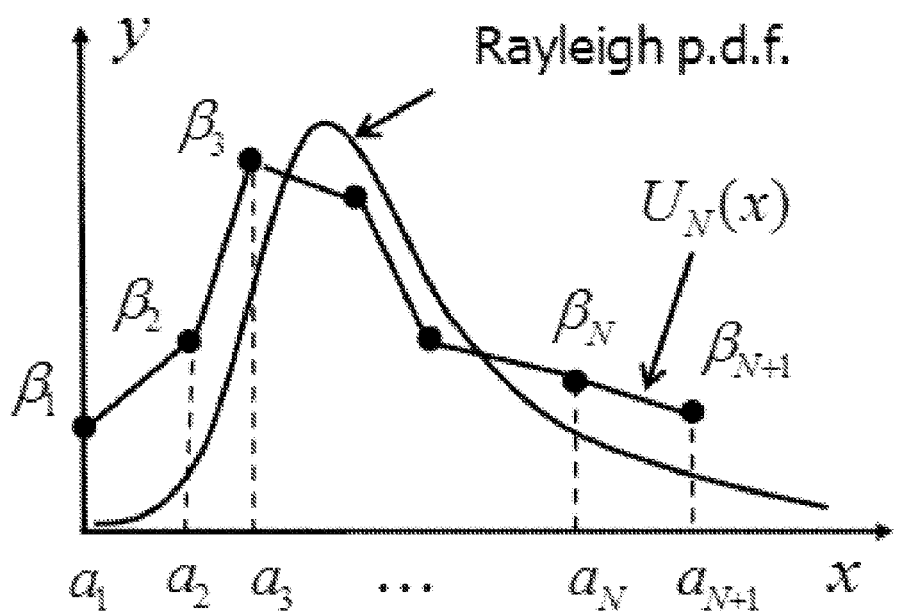
FIG. 1 is a graph showing piecewise linear approximation to a preferred embodiment of the invention.
Figure 2:
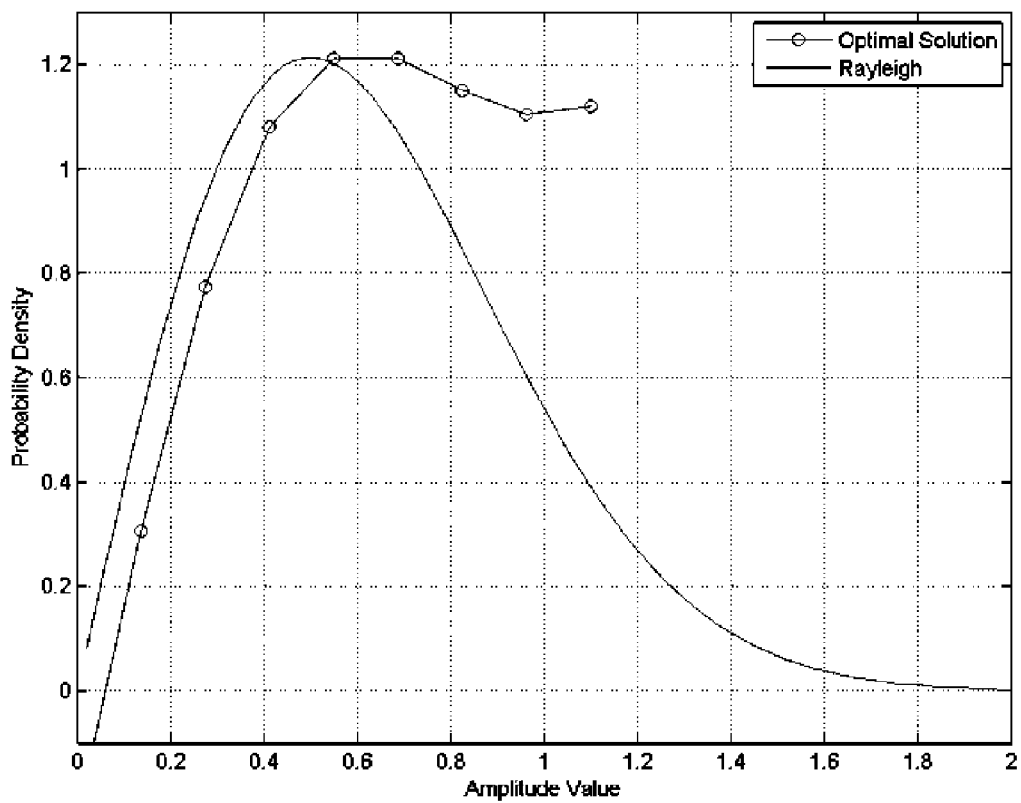
FIG. 2 is a graph showing optimal solution, A=1.1.
Figure 3:
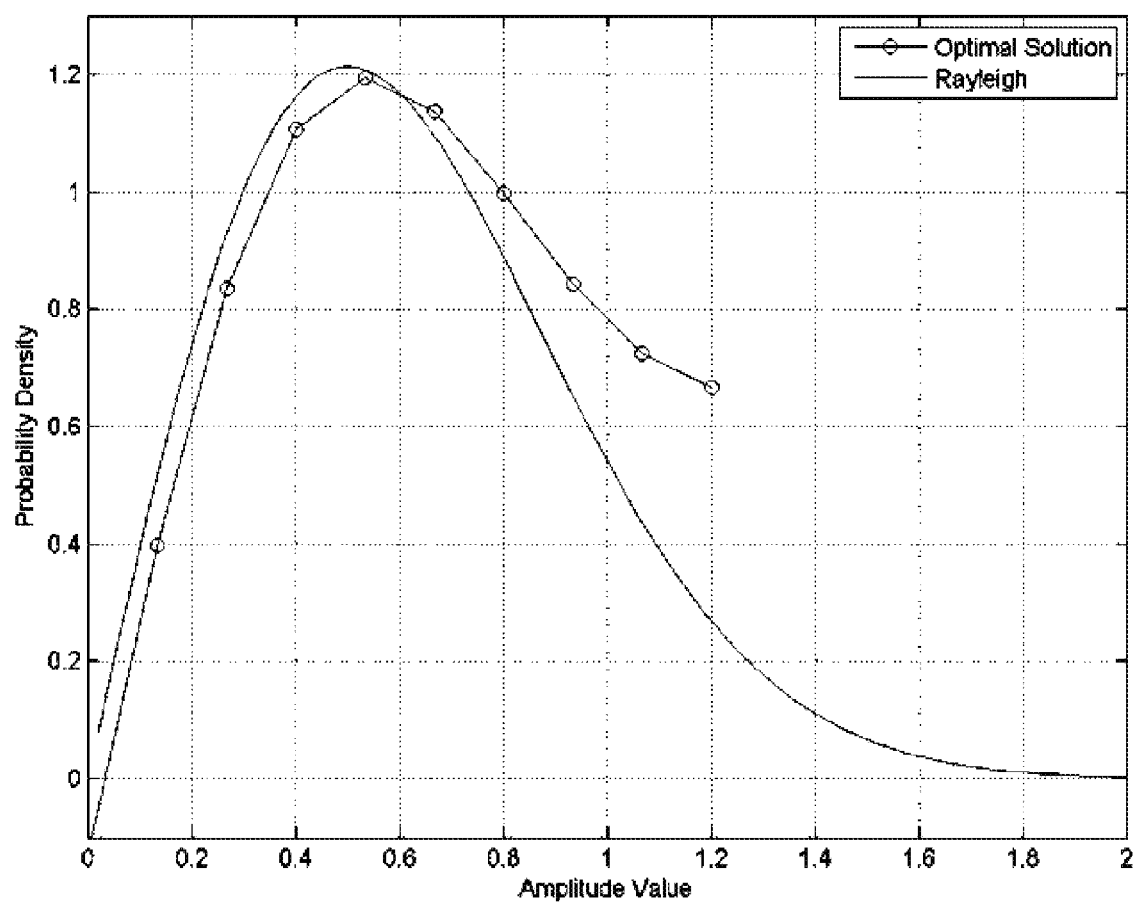
FIG. 3 is a graph showing optimal solution, A=1.2.
Figure 4:
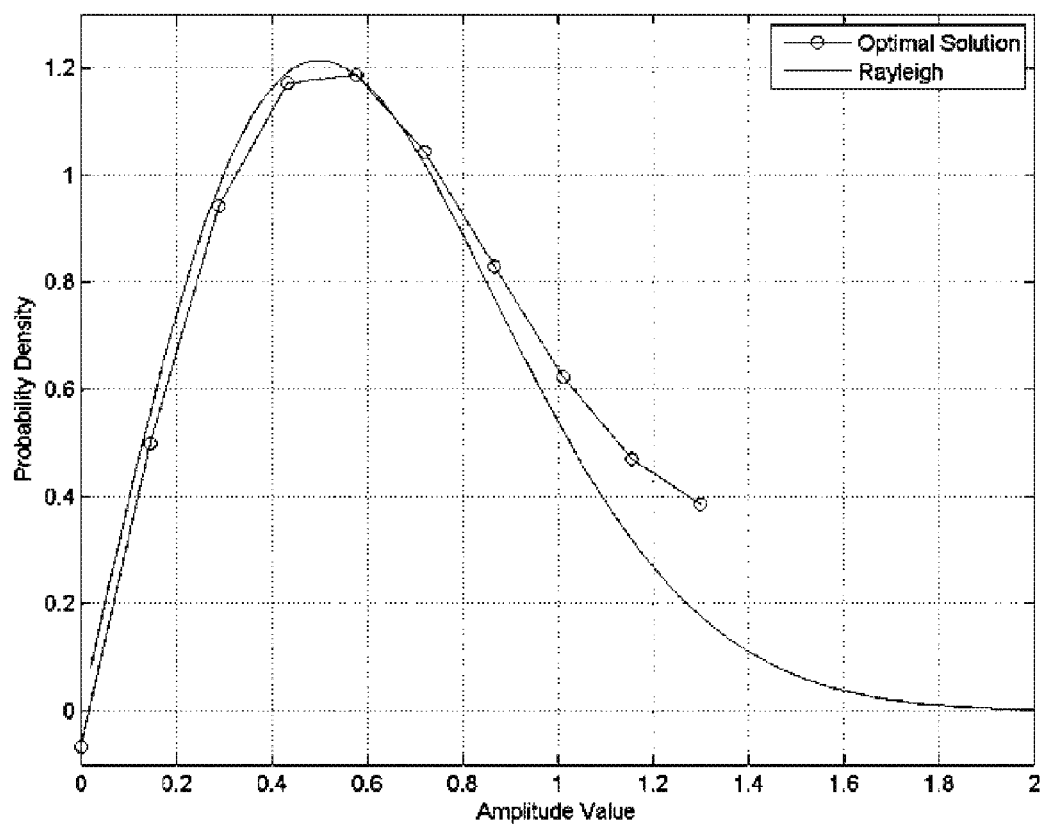
FIG. 4 is a graph showing optimal solution, A=1.3.
Figure 5:
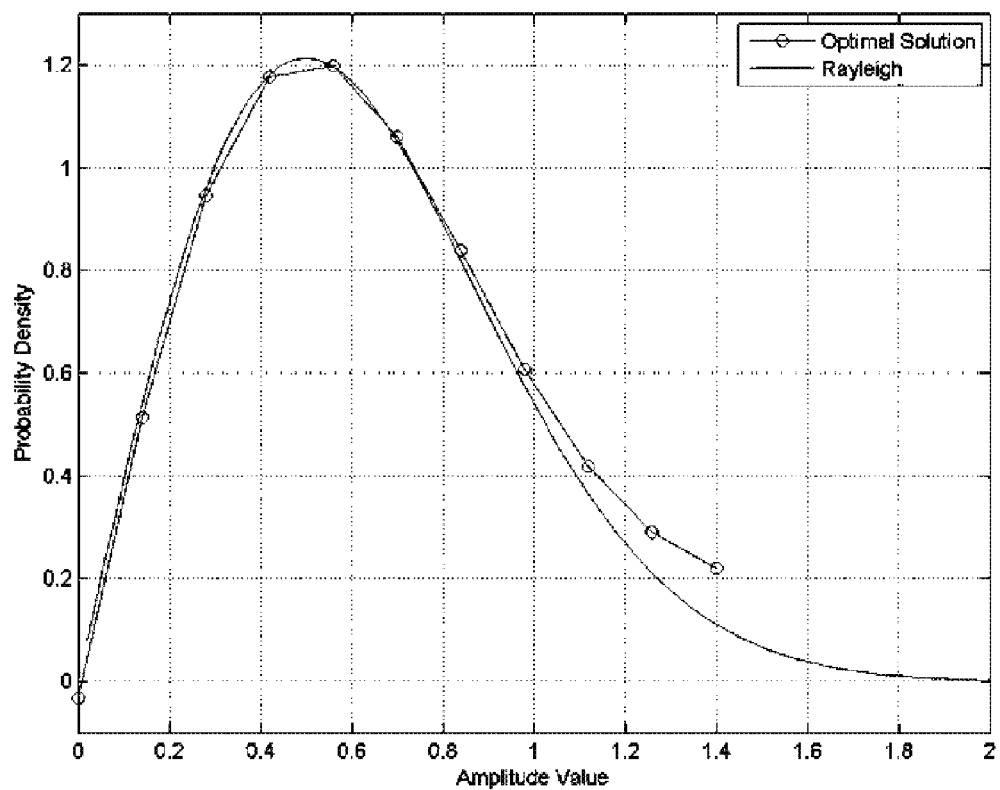
FIG. 5 is a graph showing optimal solution, A=1.4.
Figure 6:
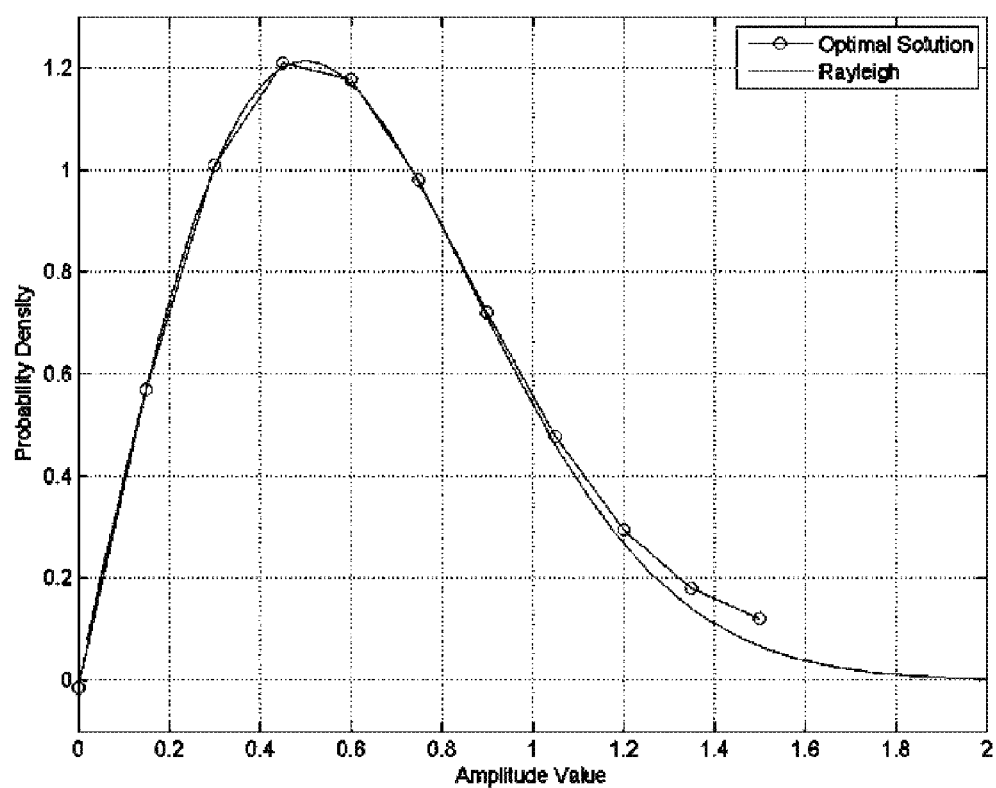
FIG. 6 is a graph showing optimal solution, A=1.5.
Figure 7:
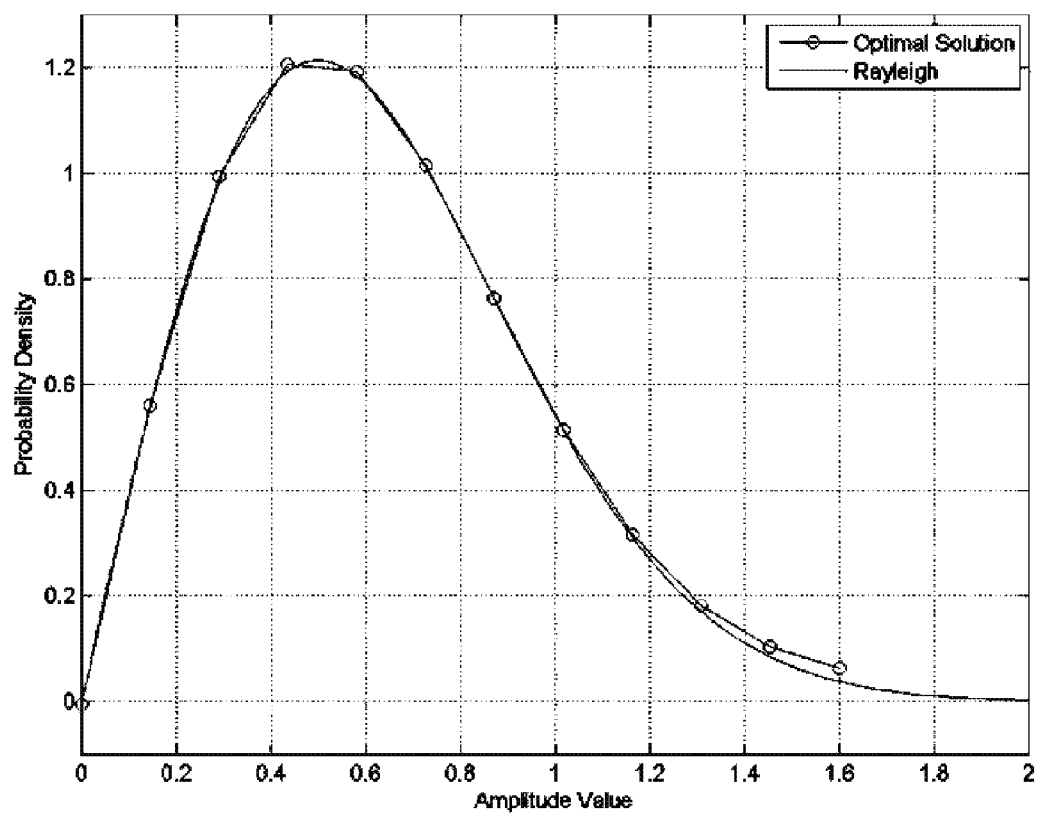
FIG. 7 is a graph showing optimal solution, A=1.6.
Figure 8:
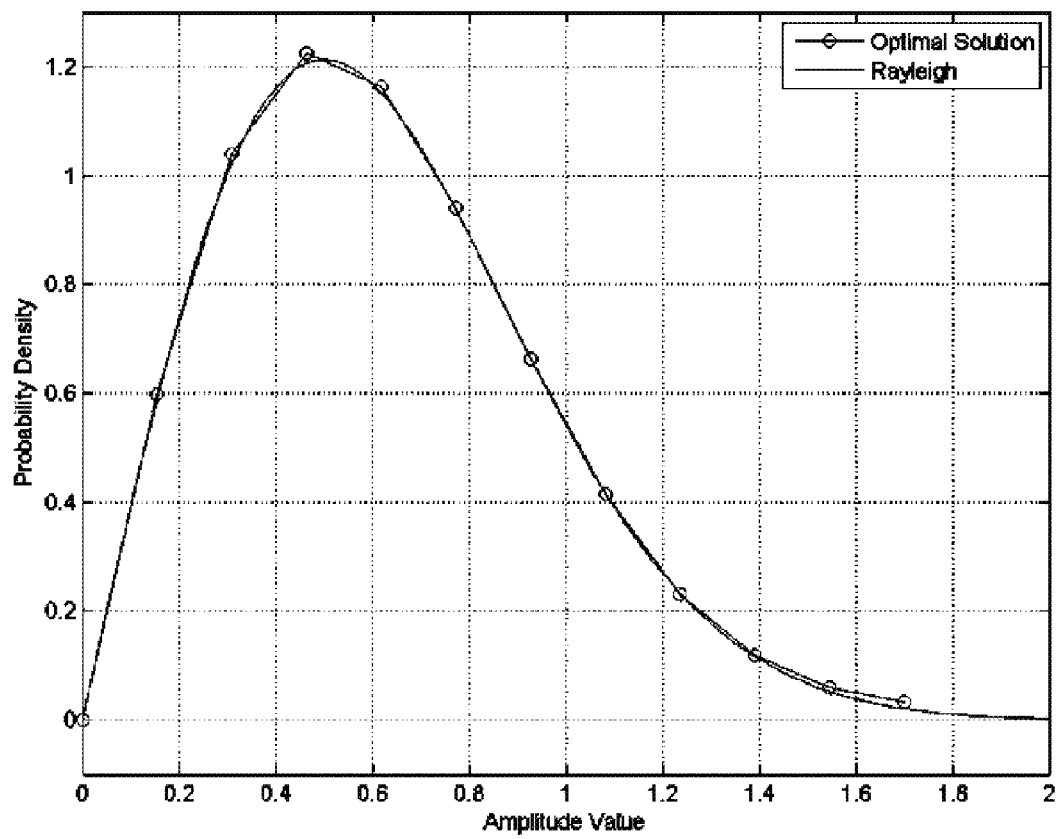
FIG. 8 is a graph showing optimal solution, A=1.7.
Figure 9:
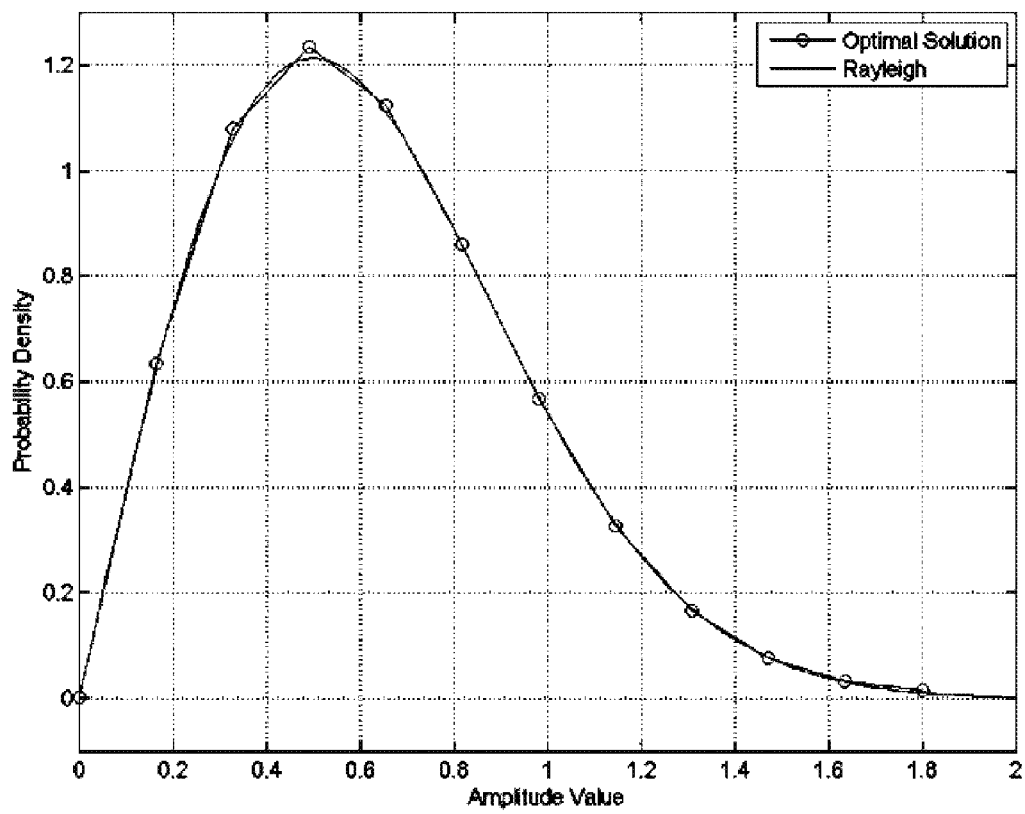
FIG. 9 is a graph showing optimal solution, A=1.8.

The present disclosure describes new companders that use a constrained optimization approach for reducing peak-to-average power ratio (PAPR) in orthogonal frequency-division multiplexing (OFDM) signals. A constrained optimization approach, in this context, involves optimizing an objective function, specifically an energy function, with respect to changeable elements, i.e. variables, in the presence of constraints on those variables.

Companders, devices which use both compression and expansion to improve dynamic range and signal-to-noise ratio, in accordance with the present disclosure provide symbol error rate performance improvements over current state-of-the art companders. In digital communications, symbol rate (also known as baud or modulation rate) is the number of symbol changes (waveform changes or signalling events) made to the transmission medium per second using a digitally modulated signal. The symbol rate is measured in baud (Bd) or symbols per second. Each symbol can represent or convey one or several bits of data. The symbol error rate is simply the rate at which signalling events fail to convey the intended data.

The newly-designed companders also provide design flexibility, thereby expanding the space of tradeoffs between demodulation performance, PAPR reduction, and out-of-band power rejection. Furthermore, the new companders provide solutions in operating regions where certain current companders fail to exit; solutions may be derived for cutoff amplitude values that are unobtainable using other companders. The new compander solutions enable tuning the cutoff amplitude value based on power amplifier bandwidth.

Below, we formulate the constrained optimization problem and derive the compander and decompander forms. Through numerical simulation, we generate performance results demonstrating the capability of the new companders.

1. COMPANDER DESIGN USING CONSTRAINED OPTIMIZATION

This section describes the constrained optimization problem and solution, and derives the compander and decompander.

1.1. Constrained Optimization Problem Definition

Denote the Rayleigh amplitude distribution by $f_R(x)$ for:

$$f_R(x) = \frac{2x}{\sigma^2} e^{-\frac{x^2}{\sigma^2}}$$

In the above equation, $f_R(x)$ represents the probability density function of the amplitude values of the OFDM signal. This is a statistical description of the spread of amplitude values of the OFDM signal, which follow a Rayleigh distribution. We then look for a function $g(x)$ which minimizes:

$$\int_0^A (f_R(x) - g(x))^2 dx \quad (1)$$

This function is used because we are making the assumption, or operating under the hypothesis, that minimal distortion of the natural signal distribution (i.e., the Rayleigh distribution) will incur minimal signal distortion of the companded function and hence reduce the demodulation errors (i.e., reduce the symbol error rate).

We then choose $g(x)$ to be of piecewise linear form:

$$g(x) = \sum_{i=1}^{N} U_i(x)$$

In the above equation, the piecewise linear form was chosen since it extends previous work on using single linear components, with the view that the increased flexibility of the piecewise approach will lead to better performing companders. Another reason it was used is that it allows a closed form expression for the compander weights to be found, by solving a linear system of equations.

Still referring to the above equation, each $U_i(x)$ is a compactly-supported linear segment, in this context, meaning a line segment of finite extent, i.e., of finite length. The $U_i(x)$ is defined by equation (2) and for each index i, represents the equation for one of the linear segments shown in FIG. 1.

$$U_i(x) = \begin{cases} \left(\frac{\beta_{i+1} - \beta_i}{a_{i+1} - a_i}\right)(x - a_i) + \beta_i & \text{for } x \in [a_i, a_{i+1}] \\ 0 & \text{otherwise} \end{cases} \quad (2)$$

and $(a_1, \ldots a_{N+1})$ is a partition of the interval $[0, A]$ and the $\beta_i$ are the ordinates at $x=a_i$ (FIG. 1). This interval is a standard interval used in PAPR reduction techniques, and represents an interval of amplitude values, covering amplitude values between 0 and A. Any amplitude value in the original OFDM signal that is larger than A gets mapped to something less than or equal to A, so A is the maximum value the companded value can have.

With the assumed form of $g(x)$, we want to minimize:

$$F(\beta_1, \ldots \beta_{N+1}) = \int_0^A (f_R(x) - g(x))^2 dx \quad (3)$$

as a function of the $\beta_i$. The function that we are minimizing represents a measure of the deviation of the new, companded function amplitude value distribution from the original OFDM Rayleigh amplitude distribution. The beta values are the values of the piecewise linear component functions at the endpoints, as shown in FIG. 1. (i.e., the ordinates), and described by the functions $U_i(x)$.

There are two constraints on $g(x)$; $g(x)$ is a probability density function and so must integrate to unity value over $x \in [0, A]$. This is because, by definition, a probability density function gives an amount of probability per unit of something, in this case, per unit of signal amplitude value. Since the total probability of all of the possibilities adds up (integrates up) to one, then the integral of the probability density function over all of its values must equal the total probability value of one.

$$\int_0^A g(x) dx = 1 \quad (4)$$

This is the unity cumulative distribution function (c.d.f.) constraint. The c.d.f. itself describes the probability that a real-valued random variable x with a given probability distribution will be found to have a value less than or equal to x. In the case of a continuous distribution, it gives the area under the probability density function (p.d.f.) from minus infinity to x.

The second constraint is the constant power constraint:

$$\int_0^A x^2 g(x)\,dx = \int_0^\infty x^2 f_R(x)\,dx = \sigma^2 \qquad (5)$$

In the above equation, equation 5, the integral on the right represents the total power across all possible amplitude values, and its value is equal to the constant value sigma times sigma, hence the total power is the constant value sigma times sigma.

There is actually a third constraint on g(x); because g(x) is a p.d.f., we have a non-negativity constraint:

$$g(x) \geq 0 \qquad (6)$$

However, we forgo the non-negativity constraint, because, as is discussed later, we can slightly perturb the optimal solution to generate non-negative solutions. The constrained optimization problem then becomes: minimize (3) for the $\beta_i$ subject to (4) and (5). We solve this using Lagrange multipliers, a strategy for finding the local maxima and minima of a function subject to equality constraints.

1.2. Calculation of Partial Derivatives

To solve the constrained optimization problem, we need to calculate the partial derivatives of F. First consider:

$$F(\beta_1, \ldots \beta_{N+1}) = \int_0^A \left(f_R(x) - \sum_{i=1}^N U_i(x)\right)^2 dx \qquad (7)$$

This equation results from eq. (1), where we use the piecewise linear form for function g, and call the whole thing F, and in F we explicitly identify the fact that the expression is now a function of the beta parameters, as shown from eq 2.

Because the integrand in (7) is continuously differentiable and integrable for $x \neq \beta_i$, then differentiation is permitted under the integral sign and:

$$\frac{\partial F}{\partial \beta_j} = \int_0^A \frac{\partial}{\partial \beta_j} \left(f_R(x) - \sum_{i=1}^N U_i(x)\right)^2 dx = \qquad (8)$$

$$\int_0^A 2\left(f_R(x) - \sum_{i=1}^N U_i(x)\right)\left(-\frac{\partial}{\partial \beta_j}\sum_{i=1}^N U_i(x)\right) dx =$$

$$\int_0^A 2\left(f_R(x) - \sum_{i=1}^N U_i(x)\right)\left(-\sum_{i=1}^N \frac{\partial U_i(x)}{\partial \beta_j}\right) dx =$$

$$2\int_0^A -f_R(x)\sum_{i=1}^N \frac{\partial U_i(x)}{\partial \beta_j} + \sum_{k=1}^N U_k(x)\sum_{i=1}^N \frac{\partial U_i(x)}{\partial \beta_j}\,dx =$$

$$-2\int_0^A f_R(x)\sum_{i=1}^N \frac{\partial U_i(x)}{\partial \beta_j}\,dx + 2\int_0^A \sum_{k=1}^N U_k(x)\sum_{i=1}^N \frac{\partial U_i(x)}{\partial \beta_j}\,dx =$$

$$-2\sum_{i=1}^N \int_{a_i}^{a_{i+1}} f_R(x)\frac{\partial U_i(x)}{\partial \beta_j}\,dx + 2\sum_{i=1}^N \int_0^A U_i(x)\frac{\partial U_i(x)}{\partial \beta_j}\,dx =$$

$$-2\sum_{i=1}^N \int_{a_i}^{a_{i+1}} f_R(x)\frac{\partial U_i(x)}{\partial \beta_j}\,dx +$$

$$2\sum_{i=1}^N \int_{a_i}^{a_{i+1}} U_i(x)\frac{\partial U_i(x)}{\partial \beta_j}\,dx$$

Now from (2), $U_i(x)$ can be rewritten as:

$$U_i(x) = \left(\frac{x - a_i}{a_{i+1} - a_i}\right)\beta_{i+1} + \left(1 - \frac{x - a_i}{a_{i+1} - a_i}\right)\beta_i$$

so that:

$$\frac{\partial U_i}{\partial \beta_j} = \left(\frac{x - a_i}{a_{i+1} - a_i}\right)\frac{\partial \beta_{i+1}}{\partial \beta_j} + \left(1 - \frac{x - a_i}{a_{i+1} - a_i}\right)\frac{\partial \beta_i}{\partial \beta_j} \qquad (9)$$

In the above equation, j represents an index on the beta parameters. For j=1, equation (9), once simplified, becomes:

$$\frac{\partial U_i}{\partial \beta_j} = \begin{cases} 1 - \dfrac{x - a_1}{a_2 - a_1} & \text{if } i = 1 \\ 0 & \text{otherwise} \end{cases} \qquad (10)$$

For $1 < j \leq N$, (9) becomes $$\frac{\partial U_i}{\partial \beta_j} = \begin{cases} 1 - \dfrac{x - a_j}{a_{j+1} - a_j} & \text{if } i = j \\ \dfrac{x - a_{j-1}}{a_j - a_{j-1}} & \text{if } i = j - 1 \\ 0 & \text{otherwise} \end{cases} \qquad (11)$$

For j=N+1, (9) becomes $$\frac{\partial U_i}{\partial \beta_j} = \begin{cases} \dfrac{x - a_N}{a_{N+1} - a_N} & \text{if } i = N \\ 0 & \text{otherwise} \end{cases} \qquad (12)$$

So, from (8), and (10), for j=1

$$\frac{\partial F}{\partial \beta_1} = -2\int_{a_1}^{a_2} f_R(x)\left(1 - \frac{x - a_1}{a_2 - a_1}\right)dx + 2\int_{a_1}^{a_2} U_1(x)\left(1 - \frac{x - a_1}{a_2 - a_1}\right)dx \qquad (13)$$

From (8), and (11), for $1 < j \leq N$ $$\frac{\partial F}{\partial \beta_j} = \qquad (14)$$

$$-2\int_{a_{j-1}}^{a_j} f_R(x)\left(\frac{x - a_{j-1}}{a_j - a_{j-1}}\right)dx - 2\int_{a_j}^{a_{j+1}} f_R(x)\left(1 - \frac{x - a_j}{a_{j+1} - a_j}\right)dx +$$

$$2\int_{a_{j-1}}^{a_j} U_{j-1}(x)\left(\frac{x - a_{j-1}}{a_j - a_{j-1}}\right)dx + 2\int_{a_j}^{a_{j+1}} U_j(x)\left(1 - \frac{x - a_j}{a_{j+1} - a_j}\right)dx$$

From (8), and (12), for j=N+1

$$\frac{\partial F}{\partial \beta_{N+1}} = \qquad (15)$$

$$-2\int_{a_N}^{a_{N+1}} f_R(x)\left(\frac{x - a_N}{a_{N+1} - a_N}\right)dx + 2\int_{a_N}^{a_{N+1}} U_N(x)\left(\frac{x - a_N}{a_{N+1} - a_N}\right)dx$$

Inspection of (13)-(15) show that the following integral forms are needed:

$$K_R^1(c,d) = \int_c^d f_R(x)dx \tag{5}$$

$$K_R^2(c,d) = \int_c^d x f_R(x)dx \tag{10}$$

$$K_U^1(c,d) = \int_c^d U_j(x)dx \tag{15}$$

$$K_U^2(c,d) = \int_c^d x U_j(x)dx \tag{20}$$

In the above equations, K is used as a compact way to represent the integral on the right side of the equation. After much simplification, straightforward integration produces:

$$\int_c^d f_R(x)dx = e^{-\frac{c^2}{\sigma^2}} - e^{-\frac{d^2}{\sigma^2}} \tag{16}$$

$$\int_c^d x f_R(x)dx = ce^{-\frac{c^2}{\sigma^2}} - de^{-\frac{d^2}{\sigma^2}} + \frac{\sigma\sqrt{\pi}}{2}\left[\Phi\left(\frac{d}{\sigma}\right) - \Phi\left(\frac{c}{\sigma}\right)\right] \tag{17}$$

$$\int_c^d U_j(x)dx = \left[\frac{a_j(d-c)}{a_{j+1}-a_j} - \frac{\frac{d^2}{2}-\frac{c^2}{2}}{a_{j+1}-a_j} + (d-c)\right] \tag{18}$$

$$\beta_j + \left[\frac{\frac{d^2}{2}-\frac{c^2}{2}}{a_{j+1}-a_j} - \frac{a_j(d-c)}{a_{j+1}-a_j}\right]\beta_{j+1}$$

$$\int_c^d x U_j(x)dx = \left[\frac{a_j\left(\frac{d^2}{2}-\frac{c^2}{2}\right)}{a_{j+1}-a_j} - \frac{\frac{d^3}{3}-\frac{c^3}{3}}{a_{j+1}-a_j} + \left(\frac{d^2}{2}-\frac{c^2}{2}\right)\right] \tag{19}$$

$$\beta_j + \left[\frac{\frac{d^3}{3}-\frac{c^3}{3}}{a_{j+1}-a_j} - \frac{a_j\left(\frac{d^2}{2}-\frac{c^2}{2}\right)}{a_{j+1}-a_j}\right]\beta_{j+1}$$

where $\Phi(x)$ denotes the Gaussian error function, a special function (non-elementary) of sigmoid shape that occurs in probability, statistics, and other disciplines:

$$\Phi(x) = \int_0^x \frac{2}{\sqrt{\pi}} e^{-\xi^2} d\xi$$

From (18) and (19) we have:

$$K_U^1 = \left[\frac{a_j(d-c)}{a_{j+1}-a_j} - \frac{\frac{d^2}{2}-\frac{c^2}{2}}{a_{j+1}-a_j} + (d-c)\right] \tag{20}$$

$$\beta_j + \left[\frac{\frac{d^2}{2}-\frac{c^2}{2}}{a_{j+1}-a_j} - \frac{a_j(d-c)}{a_{j+1}-a_j}\right]\beta_{j+1} =$$

$$M_j^{U1}(a_j, a_{j+1})\beta_j + N_j^{U1}(a_j, a_{j+1})\beta_{j+1}$$

$$K_U^2 = \left[\frac{a_j\left(\frac{d^2}{2}-\frac{c^2}{2}\right)}{a_{j+1}-a_j} - \frac{\frac{d^3}{3}-\frac{c^3}{3}}{a_{j+1}-a_j} + \left(\frac{d^2}{2}-\frac{c^2}{2}\right)\right] \tag{21}$$

$$\beta_j + \left[\frac{\frac{d^3}{3}-\frac{c^3}{3}}{a_{j+1}-a_j} - \frac{a_j\left(\frac{d^2}{2}-\frac{c^2}{2}\right)}{a_{j+1}-a_j}\right]\beta_{j+1} =$$

$$M_j^{U2}(a_j, a_{j+1})\beta_j + N_j^{U2}(a_j, a_{j+1})\beta_{j+1}$$

Using (16), (17), (20), and (21) in (13) through (15) after much simplification produces for j=1:

$$\frac{\partial F}{\partial \beta_1} = P_1 \beta_1 + P_2 \beta_2 + P_0 \tag{22}$$

Where:

$$P_1 = 2M_1^{U1}(a_1, a_2) - \left(\frac{2}{a_2-a_1}\right)M_1^{U2}(a_1, a_2) + \left(\frac{2a_1}{a_2-a_1}\right)M_1^{U1}(a_1, a_2)$$

$$P_2 = 2N_1^{U1}(a_1, a_2) - \left(\frac{2}{a_2-a_1}\right)N_1^{U2}(a_1, a_2) + \left(\frac{2a_1}{a_2-a_1}\right)N_1^{U1}(a_1, a_2)$$

$$P_0 = -2K_R^1(a_1, a_2) - \left(\frac{2}{a_2-a_1}\right)K_R^2(a_1, a_2) - \left(\frac{2a_1}{a_2-a_1}\right)K_R^1(a_1, a_2).$$

In equation 22, P is used as a convenient and compact way to represent the expressions shown above.

For $1<j \leq N$:

$$\frac{\partial F}{\partial \beta_j} = Q_0(j) + Q_1(j)\beta_{j-1} + Q_2(j)\beta_j + Q_3(j)\beta_{j+1}$$

Where:

$$Q_0(j) = \left(\frac{-2}{a_j-a_{j-1}}\right)K_R^2(a_{j-1}, a_j) + \left(\frac{2a_{j-1}}{a_j-a_{j-1}}\right)K_R^1(a_{j-1}, a_j) -$$

$$2K_R^1(a_j, a_{j+1}) + \left(\frac{2}{a_{j+1}-a_j}\right)K_R^2(a_j, a_{j+1}) - \left(\frac{2a_j}{a_{j+1}-a_j}\right)K_R^1(a_j, a_{j+1})$$

$$Q_1(j) = \frac{2M_{j-1}^{U2}(a_{j-1}, a_j)}{a_j-a_{j-1}} - \frac{2a_{j-1}M_{j-1}^{U1}(a_{j-1}, a_j)}{a_j-a_{j-1}}$$

$$Q_2(j) = \frac{2N_{j-1}^{U2}(a_{j-1}, a_j)}{a_j-a_{j-1}} - \frac{2a_{j-1}N_{j-1}^{U1}(a_{j-1}, a_j)}{a_j-a_{j-1}} +$$

$$2M_j^{U1}(a_j, a_{j+1}) - \frac{2M_j^{U2}(a_j, a_{j+1})}{a_{j+1}-a_j} + \frac{2a_j M_j^{U1}(a_j, a_{j+1})}{a_{j+1}-a_j}$$

-continued $$Q_3(j) = 2N_j^{U1}(a_j, a_{j+1}) - \frac{2N_j^{U2}(a_j, a_{j+1})}{a_{j+1} - a_j} + \frac{2a_j N_j^{U1}(a_j, a_{j+1})}{a_{j+1} - a_j}$$

In the preceding equation for $1<j\leq N$, Q is used as a convenient and compact way to represent the expressions shown above.

M, as used above, is similarly a convenient, compact expression, seen in eq. 20. It is the term inside the first set of brackets in eq. 20.

N, as used above, is also a convenient, compact expression, seen in eq. 20. It is the term inside the second set of brackets in eq. 20.

For $j=N+1$:

$$\frac{\partial F}{\partial \beta_{N+1}} = R_1 \beta_N + R_2 \beta_{N+1} + R_0$$

Where:

$$R_0 = \frac{-2K_R^2(a_N, a_{N+1})}{a_{N+1} - a_N} + \frac{2a_N K_R^1(a_N, a_{N+1})}{a_{N+1} - a_N}$$

$$R_1 = \left(\frac{2}{a_{N+1} - a_N}\right) M_N^{U2}(a_N, a_{N+1}) - \left(\frac{2a_N}{a_{N+1} - a_N}\right) M_N^{U1}(a_N, a_{N+1})$$

$$R_2 = \left(\frac{2}{a_{N+1} - a_N}\right) N_N^{U2}(a_N, a_{N+1}) - \left(\frac{2a_N}{a_{N+1} - a_N}\right) N_N^{U1}(a_N, a_{N+1})$$

The R variables used in the preceding paragraphs are just convenient, compact expressions for the quantities shown directly above this paragraph.

To summarize:

$$\frac{\partial F}{\partial \beta_j} = \begin{cases} P_1 \beta_1 + P_2 \beta_2 + P_0 & \text{for } j = 1 \\ Q_0(j) + Q_1(j)\beta_{j-1} + Q_2(j)\beta_j + Q_3(j)\beta_{j+1} & \text{for } 1 < j \leq N \\ R_1 \beta_N + R_2 \beta_{N+1} + R_0 & \text{for } j = N + 1 \end{cases} \quad (23)$$

1.3. Unity C.D.F. Constraint

From (4), we have:

$$\int_0^A g(x)dx = \int_0^A \sum_{i=1}^N U_i(x)dx = \quad (24)$$

$$\sum_{i=1}^N \int_0^A U_i(x)dx = \sum_{i=1}^N \int_{a_i}^{a_{i+1}} \left(\frac{\beta_{i+1} - \beta_i}{a_{i+1} - a_i}\right)(x - a_i) + \beta_i dx =$$

$$\sum_{i=1}^N \int_{a_i}^{a_{i+1}} \left(\frac{\beta_{i+1} - \beta_i}{a_{i+1} - a_i}\right) x + \left[\beta_i - \frac{a_i(\beta_{i+1} - \beta_i)}{a_{i+1} - a_i}\right] dx$$

Let:

$$m_i = \frac{\beta_{i+1} - \beta_i}{a_{i+1} - a_i},$$

$$b_i = \beta_i - \frac{a_i(\beta_{i+1} - \beta_i)}{a_{i+1} - a_i}.$$

Then (24) becomes:

$$\int_0^A g(x)dx = \sum_{i=1}^N \int_{a_i}^{a_{i+1}} m_i x + b_i dx = \quad (25)$$

$$\sum_{i=1}^N m_i \frac{x^2}{2} + b_i x \bigg|_{a_i}^{a_{i+1}} = \sum_{i=1}^N m_i \left(\frac{a_{i+1}^2}{2} - \frac{a_i^2}{2}\right) + b_i(a_{i+1} - a_i) =$$

$$\sum_{i=1}^N \left(\frac{\beta_{i+1} - \beta_i}{a_{i+1} - a_i}\right)\left(\frac{a_{i+1}^2}{2} - \frac{a_i^2}{2}\right) + \left[\beta_i - \frac{a_i(\beta_{i+1} - \beta_i)}{a_{i+1} - a_i}\right](a_{i+1} - a_i)$$

After further simplification, (25) becomes:

$$\int_0^A g(x)dx = \sum_{i=1}^N T_i^1 \beta_i + T_i^2 \beta_{i+1}$$

Where:

$$T_i^1 = a_{i+1} - \frac{a_{i+1}^2 - a_i^2}{2(a_{i+1} - a_i)} \quad (26)$$

$$T_i^2 = \frac{a_{i+1}^2 - a_i^2}{2(a_{i+1} - a_i)} - a_i \quad (27)$$

Define:

$$g_1(\beta_1, \ldots B_{N+1}) = \sum_{i=1}^N T_i^1 \beta_i + T_i^2 \beta_{i+1} \quad (28)$$

Then the unity c.d.f. constraint, (4), is expressed as $$g_1(\beta_1, \ldots, \beta_{N+1}) = 1 \quad (29)$$

1.4. Constant Power Constraint

Consider (5):

$$\int_0^A x^2 g(x) dx = \int_0^A x^2 \sum_{i=1}^N U_i(x) dx = \sum_{i=1}^N \int_0^A x^2 U_i(x) dx =$$

$$\sum_{i=1}^N \int_{a_i}^{a_{i+1}} x^2 U_i(x) dx = \sum_{i=1}^N \int_{a_i}^{a_{i+1}} x^2 (m_i x + b_i) dx =$$

$$\sum_{i=1}^N m_i \frac{x^4}{4} + b_i \frac{x^3}{3} \bigg|_{a_i}^{a_{i+1}} = \sum_{i=1}^N m_i \left(\frac{a_{i+1}^4}{4} - \frac{a_i^4}{4}\right) + b_i \left(\frac{a_{i+1}^3}{3} - \frac{a_i^3}{3}\right)$$

This equation comes directly from equation 5, where we replaced the g(x) with the assumed form shown earlier. After much simplification, this equation becomes:

$$\int_0^A x^2 g(x)dx = \sum_{i=1}^N W_i^1 \beta_i + W_i^2 \beta_{i+1}$$

Where:

$$W_i^1 = \frac{a_{i+1}^3 - a_i^3}{3} - \frac{a_{i+1}^4 - a_i^4}{4(a_{i+1} - a_i)} + \frac{a_i(a_{i+1}^3 - a_i^3)}{3(a_{i+1} - a_i)}$$

$$W_i^2 = \frac{a_{i+1}^4 - a_i^4}{4(a_{i+1} - a_i)} - \frac{a_i(a_{i+1}^3 - a_i^3)}{3(a_{i+1} - a_i)}$$

Define:

$$g_2(\beta_1, \ldots \beta_{N+1}) = \sum_{i=1}^{N} W_i^1 \beta_i + W_i^2 \beta_{i+1} \quad (30)$$

Then, the constant power constraint (5) becomes:

$g_2(\beta_1, \ldots \beta_{N+1}) = \sigma^2$.

1.5. Lagrangian Definition

When we take the partial derivatives of the Lagrangian and set them to zero to find the stationary points, we get a system of equations which includes the original system of equations (i.e., for F), plus the two constraint equations. Hence, the Lagrangian contains or includes or encompasses the constraints along with the original system, allowing the Lagrangian, i.e. the mathematical function that summarizes the dynamics of the system, to be defined as:

$\Lambda(\beta_1, \ldots \beta_{N+1}, \lambda_1, \lambda_2) = F(\beta_1, \ldots \beta_{N+1}) + \lambda_1[g_1(\beta_1, \ldots \beta_{N+1}) - 1] + \lambda_2[g_2(\beta_1, \ldots \beta_{N+1}) - \sigma^2]$ Solve the set of equations:

$$\frac{\partial \Lambda}{\partial \beta_j} = 0 \quad (31)$$

$$\frac{\partial \Lambda}{\partial \lambda_1} = 0$$

$$\frac{\partial \Lambda}{\partial \lambda_2} = 0.$$

We have:

$$\frac{\partial \Lambda}{\partial \beta_j} = \frac{\partial F}{\partial \beta_j} + \lambda_1 \frac{\partial g_1}{\partial \beta_j} + \lambda_2 \frac{\partial g_2}{\partial \beta_j} \quad (32)$$

$$\frac{\partial \Lambda}{\partial \lambda_1} = g_1(\beta_1, \ldots B_{N+1}) - 1$$

$$\frac{\partial \Lambda}{\partial \lambda_2} = g_2(\beta_1, \ldots B_{N+1}) - \sigma^2.$$

From (32), we see that we need the partial derivatives of $g_1, g_2$. We set the partial derivatives to zero, then solve for the betas to give values that under certain conditions represent the maximum or minimum of the function. We do this for the Lagrangian, because we want to include the constraints also, so we solve for beta parameter values which maximize or minimize the system and which also satisfy the constraints. From (28), we have, for j=1:

$$\frac{\partial g_1}{\partial \beta_j} = \begin{cases} T_1^1 & \text{for } j = 1 \\ T_{j-1}^2 + T_j^1 & \text{for } 1 < j \leq N \\ T_N^2 & \text{for } j = N+1 \end{cases} \quad (33)$$

From (30), we have:

$$\frac{\partial g_2}{\partial \beta_j} = \begin{cases} W_1^1 & \text{for } j = 1 \\ W_{j-1}^2 + W_j^1 & \text{for } 1 < j \leq N \\ W_N^2 & \text{for } j = N+1 \end{cases} \quad (34)$$

Combining all the partial derivative expressions from (23), (33) and (34) gives:

$$\frac{\partial \Lambda}{\partial \beta_j} = \quad (35)$$

$$\begin{cases} (P_0 + P_1\beta_1 + P_2\beta_2) + \lambda_1 T_1^1 + \lambda_2 W_1^1 & \text{for } j = 1 \\ [Q_0(j) + Q_1(j)\beta_{j-1} + Q_2(j)\beta_j + Q_3(j)\beta_{j+1}] + \\ \quad \lambda_1(T_{j-1}^2 + T_j^1) + \lambda_2(W_{j-1}^2 + W_j^1) & \text{for } 1 < j \leq N \\ (R_0 + R_1\beta_N + R_2\beta_{N+1}) + \lambda_1 T_N^2 + \lambda_2 W_N^2 & \text{for } j = N+1 \end{cases}$$

From (35) and the system (31), we have the system of equations:

$$(T_1^1)\lambda_1 + (W_1^1)\lambda_2 + (P_1)\beta_1 + (P_2)\beta_2 = -P_0$$

$$\vdots$$

$$(T_{j-1}^2 + T_j^1)\lambda_1 + (W_{j-1}^2 + W_j^1)\lambda_2 +$$
$$(Q_1(j))\beta_{j-1} + (Q_2(j))\beta_j + (Q_3(j))\beta_{j+1} = -Q_0(j)$$

$$\vdots$$

$$(T_N^2)\lambda_1 + (W_N^2)\lambda_2 + (R_1)\beta_N + (R_2)\beta_{N+1} = -R_0$$

$$(0)\lambda_1 + (0)\lambda_2 + T_1^1 \beta_1 +$$
$$(T_1^2 + T_2^1)\beta_2 + \ldots + (T_{N-1}^2 + T_N^1)\beta_N + (T_N^2)\beta_{N+1} = 1$$

$$(0)\lambda_1 + (0)\lambda_2 + W_1^1 \beta_1 + (W_1^2 + W_2^1)\beta_2 + \ldots +$$
$$(W_{N-1}^2 + W_N^1)\beta_N + (W_N^2)\beta_{N+1} = \sigma^2.$$

The vertical three dots, as used above, signify that you continue on with the same pattern for the next value of the index j. So, the first equation gives the expression for j=1, then you continue with the same pattern for the remaining j values until the next expression. The reason why the three dots are used is two-fold: first it is compact notation, and second you don't have an exact number for the maximum value of j (it is a variable) so you can't write out all of the equations, in general.

In matrix form, the system of equations becomes:

$$\begin{pmatrix} T_1^1 & W_1^1 & P_1 & P_2 & 0 & & & & 0 \\ T_1^2+T_2^1 & W_1^2+W_2^1 & Q_1(2) & Q_2(2) & Q_3(2) & 0 & & & 0 \\ \vdots & & & & & & & & \\ T_{j-1}^2+T_j^1 & W_{j-1}^2+W_j^1 & 0 & & 0 & Q_1(j) & Q_2(j) & Q_3(j) & 0 & 0 \\ \vdots & & & & & & & & \\ T_N^2 & W_N^2 & 0 & & & & 0 & R_1 & R_2 \\ 0 & 0 & T_1^1 & T_1^2+T_2^1 & T_2^2+T_3^1 & \ldots & & T_{N-1}^2+T_N^1 & T_N^2 \\ 0 & 0 & W_1^1 & W_1^2+W_2^1 & W_2^2+W_3^1 & \ldots & & W_{N-1}^2+W_N^1 & W_N^2 \end{pmatrix} \quad (36)$$

$$\begin{pmatrix} \lambda_1 \\ \lambda_2 \\ \vdots \\ \beta_j \\ \vdots \\ \beta_{N-1} \\ \beta_N \\ \beta_{N+1} \end{pmatrix} = \begin{pmatrix} -P_0 \\ -Q_0(2) \\ \vdots \\ -Q_0(j) \\ \vdots \\ -R_0 \\ 1 \\ \sigma^2 \end{pmatrix}$$

The matrix form can then be solved numerically.

1.6. Hessian Matrix

A Hessian Matrix, sometimes referred to as simply a Hessian, is a square matrix of second-order partial derivatives of a scalar-valued function, or scalar field. It describes the local curvature of a function of many variables. This was also previously known by the term "functional determinants".

In this case, a Hessian Matrix is useful in determination of the critical point type, which, after solving the system (36), can be obtained from the sign test on the sequence of principal minors of the bordered Hessian [23]. To calculate the Hessian, we need the second partial derivatives. For the Lagrangian system described above, the Hessian becomes the bordered Hessian, calculated as:

$$H = \begin{pmatrix} 0 & 0 & \frac{\partial g_1}{\partial \beta_1} & \ldots & \frac{\partial g_1}{\partial \beta_j} & \ldots & \frac{\partial g_1}{\partial \beta_{N+1}} \\ 0 & 0 & \frac{\partial g_2}{\partial \beta_1} & \ldots & \frac{\partial g_2}{\partial \beta_j} & \ldots & \frac{\partial g_2}{\partial \beta_{N+1}} \\ & & \ddots & & & & \\ & & & \ddots & \frac{\partial^2 F}{\partial \beta_j \partial \beta_i} + \lambda_1 \frac{\partial^2 g_1}{\partial \beta_j \partial \beta_i} + \lambda_2 \frac{\partial^2 g_2}{\partial \beta_j \partial \beta_i} & & \\ & & & & & \ddots & \end{pmatrix}$$

From (33) and (34), we see that:

$$\frac{\partial^2 g_1}{\partial \beta_j \partial \beta_i} = \frac{\partial^2 g_2}{\partial \beta_j \partial \beta_i} = 0$$

From (23) we see that:

$$\frac{\partial^2 F}{\partial \beta_1^2} = P_1, \frac{\partial^2 F}{\partial \beta_2 \partial \beta_1} = P_2, \frac{\partial^2 F}{\partial \beta_j \partial \beta_1} = 0 \text{ for } j > 2$$

$$\frac{\partial^2 F}{\partial \beta_j^2} = Q_2(j), \frac{\partial^2 F}{\partial \beta_{j-1} \partial \beta_j} = Q_1(j), \frac{\partial^2 F}{\partial \beta_{j+1} \partial \beta_j} = Q_3(j),$$

$$\frac{\partial^2 F}{\partial \beta_k \partial \beta_j} = 0 \text{ for } k \neq \{j-1, j, j+1\},$$

$$\frac{\partial^2 F}{\partial \beta_{N+1}^2} = R_2, \frac{\partial^2 F}{\partial \beta_N \partial \beta_{N+1}} = R_1, \frac{\partial^2 F}{\partial \beta_j \partial \beta_{N+1}} = 0 \text{ for } j < N$$

Performing the sign test numerically shows that the solution to (36) is a minimum.

1.7 Numerical Solutions and Analysis

We now can solve system (36) numerically. Throughout, we take $\sigma=\sqrt{2}/2$ to generate a normalized complex signal with unit power. FIGS. 2 through 9 contain plots of the optimal solution compared against the baseline Rayleigh distribution, as a function of cutoff amplitude value A. Values of N range from 8 to 11, depending on A. Above these N values, numerical problems occur causing the determinant of the system to be close to zero and thus precluding numerical solution.

Two observations are clear from the plots in FIGS. 2 through 9. The first observation is that as the value of A increases the solution approaches the baseline Rayleigh distribution. This is most apparent when comparing the solution prior to the tail of the Rayleigh distribution, since most of the solutions appear to match the Rayleigh distribution reasonably well before the tail. On the tail, the solution tends to curve upward to satisfy the unity c.d.f. and constant power constraints. This behavior suggests that closely matching the Rayleigh distribution when possible, is a desirable solution property.

The second observation is that for almost all of the solutions, the first ordinate, i.e. the y-coordinate, representing the distance from a point to the horizontal or x-axis measured parallel to the vertical or y axis, in this case $\beta_1$, is negative and thus a portion of the solution has negative values. This condition violates the non-negativity constraint on probability density functions.

There are two methods for overcoming the partial negativity of the optimal solution. The first method increases the first abscissa, the perpendicular distance of a point from the vertical axis, $a_1=0$ value to a small but positive value, specifically until $\beta_1$ in the solution becomes positive. In this case, the solution consists of the piecewise solution for $x \geq a_1$, and the up-front portion of the Rayleigh distribution for $0 \leq x < a_1$. The perturbation of $a_1$ has generally been observed to be small.

Figure 10:
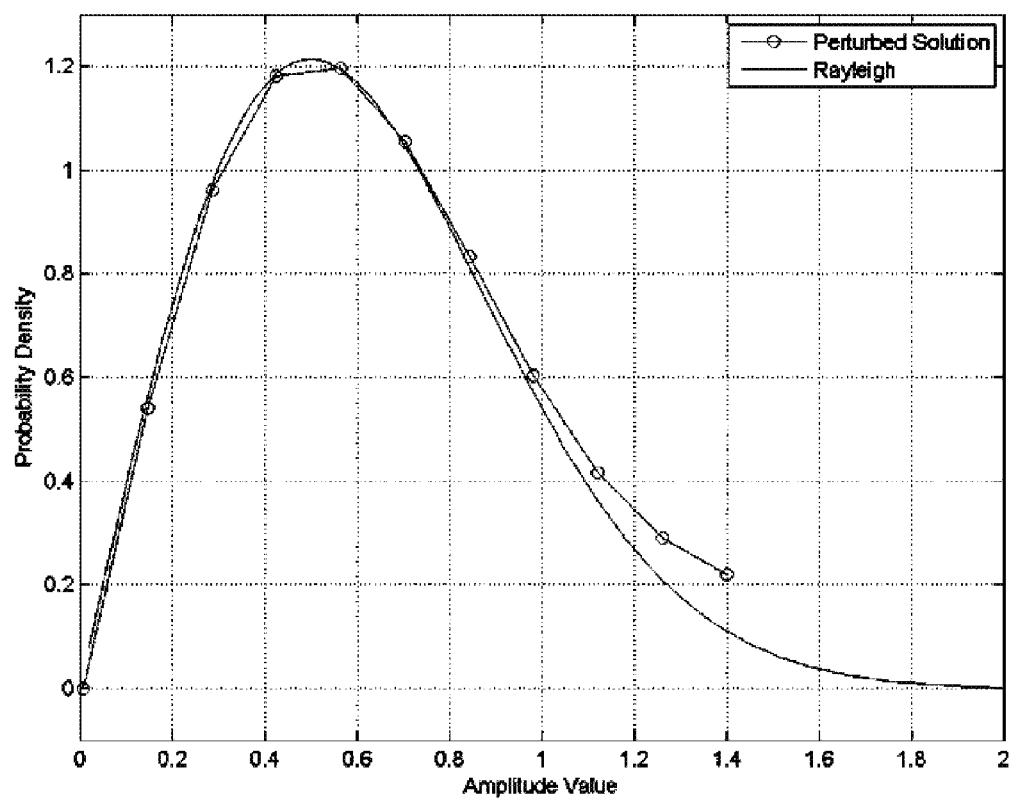
FIG. 10 is a graph showing positive perturbed solution; A=1.4.

As an example, FIG. 10 contains the solution for A=1.4. In that instance, a value of $a_1=0.0082$ is sufficient to make $\beta_1>0$. The solution shown in FIG. 10 is negligibly different from the optimal solution shown in FIG. 5.

The second method for overcoming the negativity of the solution is to use the Rayleigh distribution as the front segment of the distribution, and then use a perturbed version of the back-end of the optimal solution. In this approach, the tail of the optimal solution must be perturbed to meet the new unity c.d.f. and constant power constraints, which are generated by replacing the front-end of the optimal solution with the Rayleigh distribution. This perturbation approach is discussed in the next section.

1.8. Perturbations from the Optimal Solution

Figure 11:
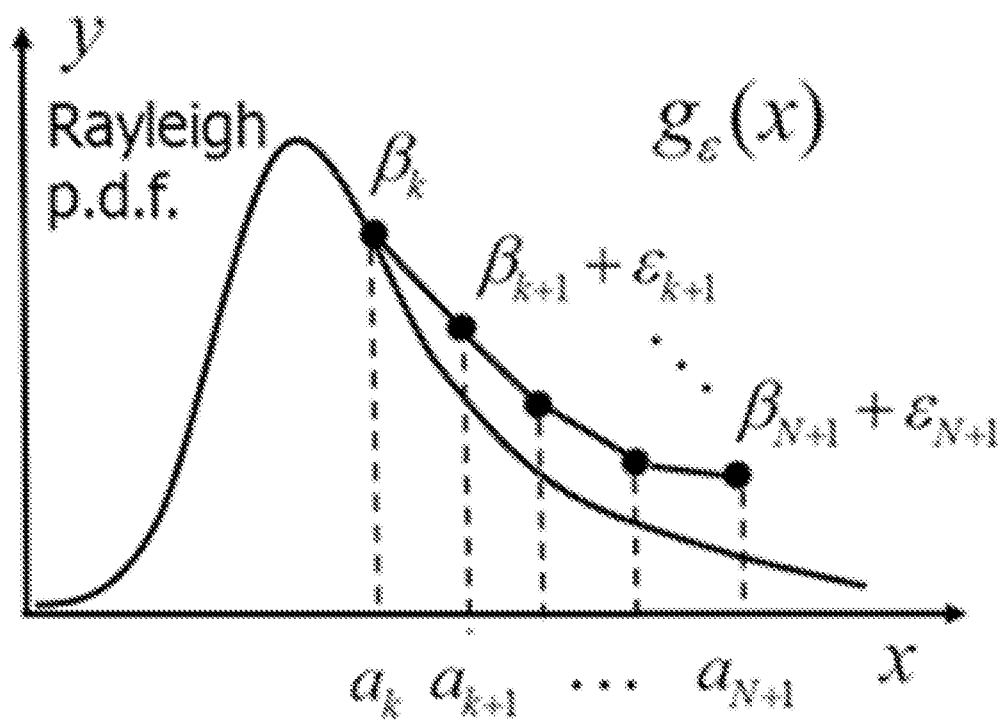
FIG. 11 is a graph showing positive perturbed function.
Figure 12:
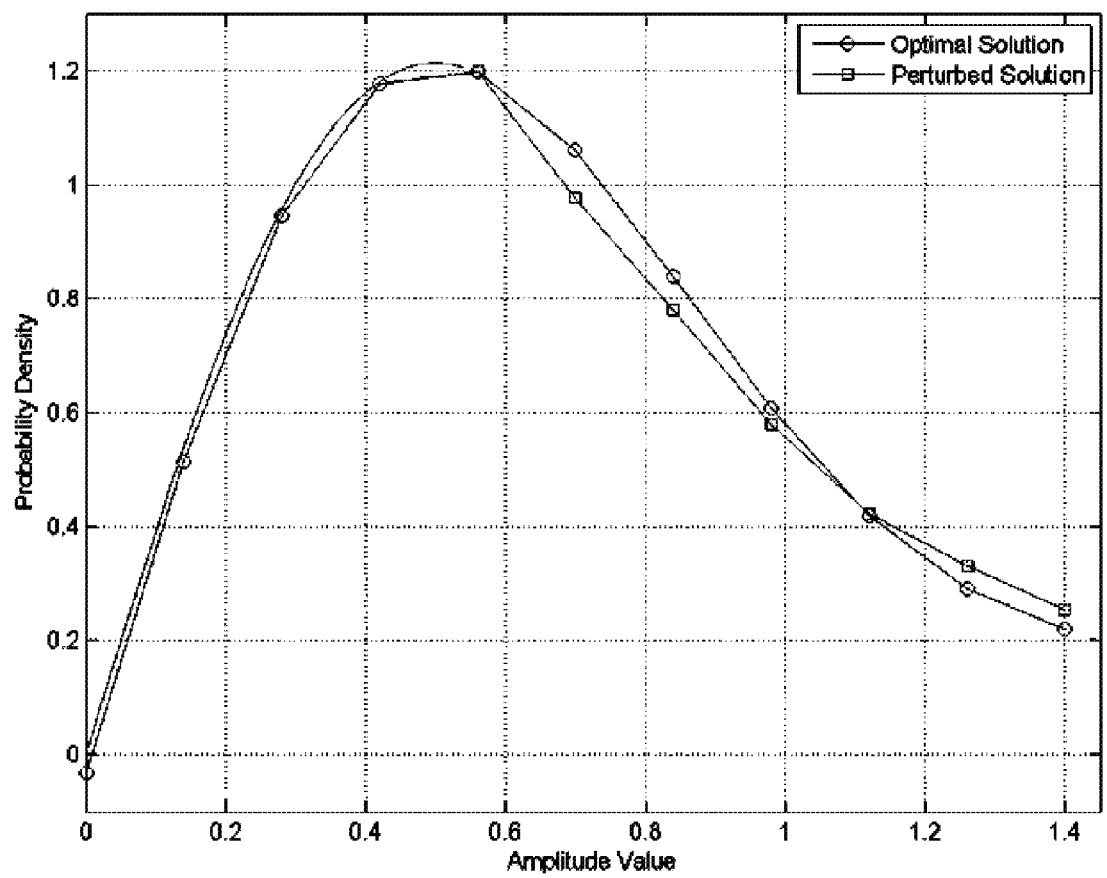
FIG. 12 is a graph showing perturbation solution; A=1.4, k=5.
Figure 13:
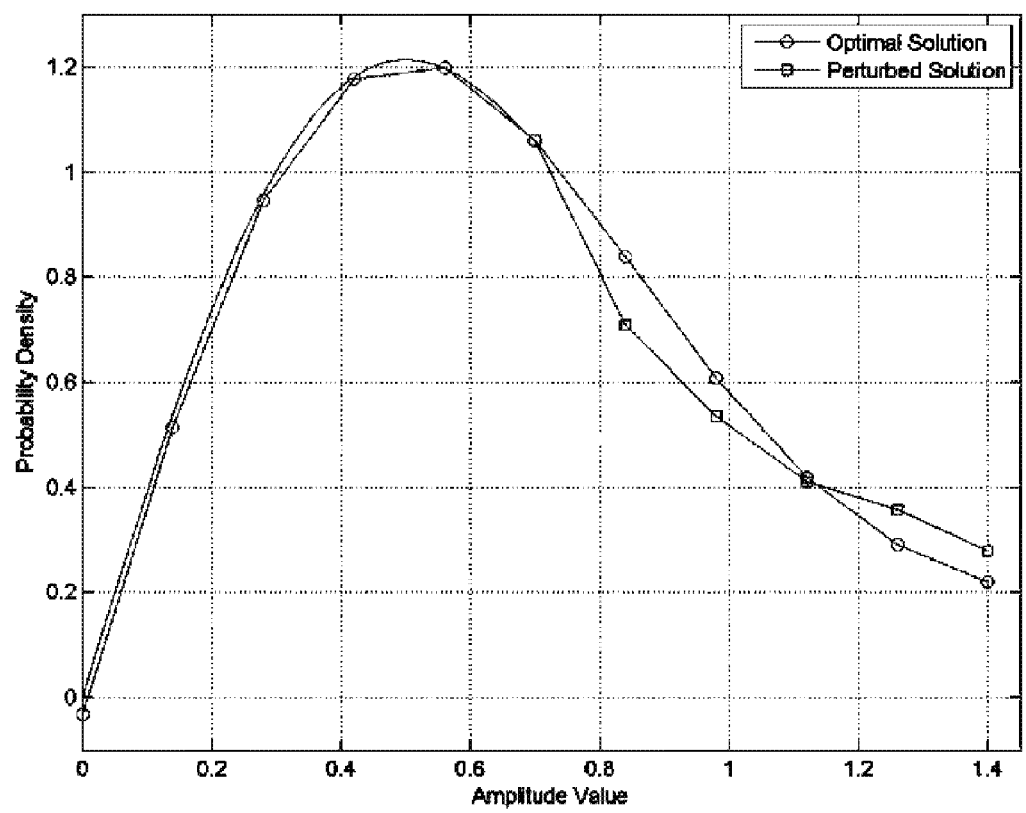
FIG. 13 is a graph showing perturbation solution; A=1.4, k=6.
Figure 14:
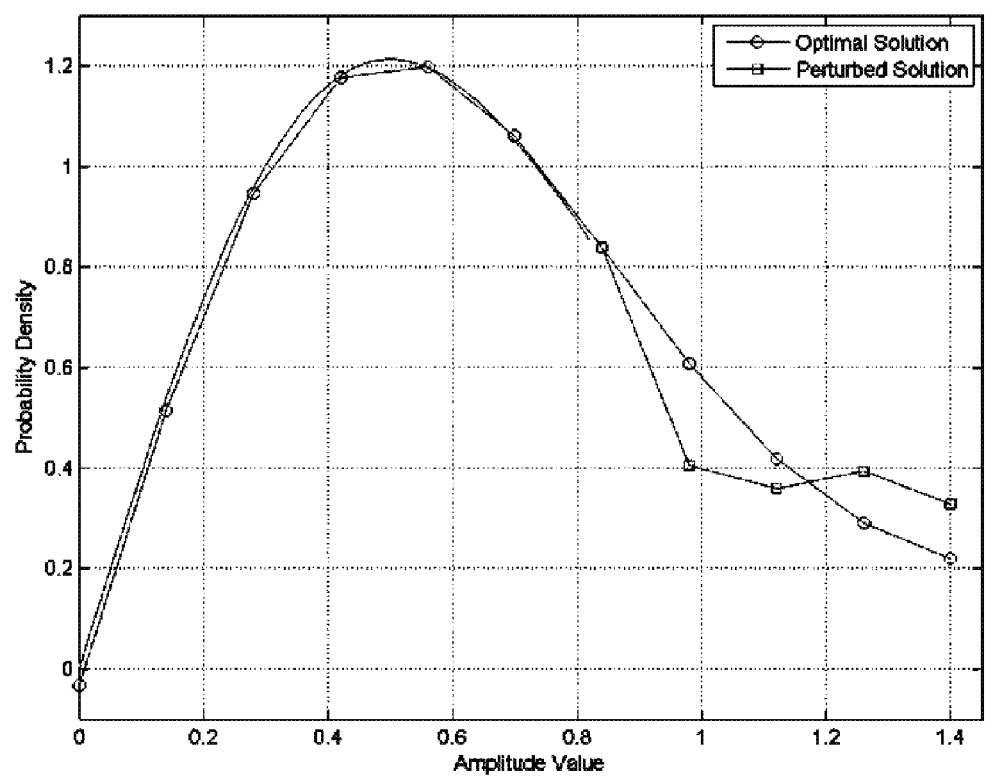
FIG. 14 is a graph showing perturbation solution; A=1.4, k=7.
Figure 15:
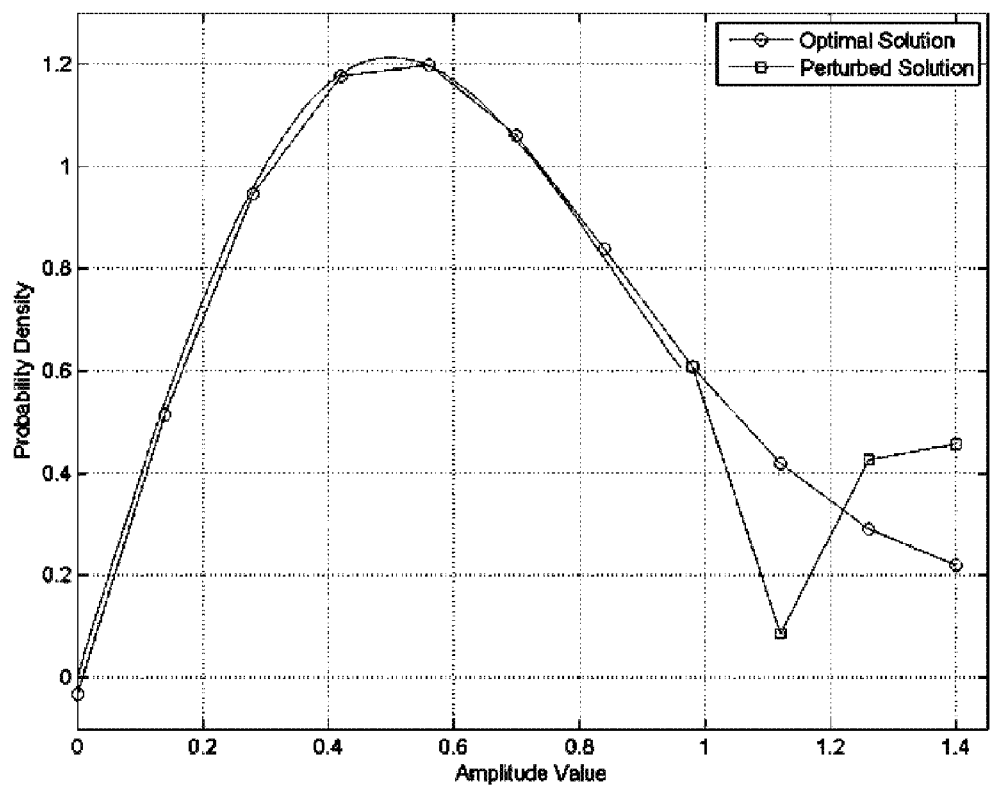
FIG. 15 is a graph showing perturbation solution; A=1.4, k=8.

Solutions of the system (36) tend to give a negative value for the first ordinate value $\beta_1$. Therefore, to determine a solution for which the non-negativity condition (6) holds, we perturb the optimal solution. We choose $a_k$ starting at the distribution tail to perturb the solution. For $x \in [0, a_1]$ we use the original Rayleigh distribution $f_R(x)$, and we perturb the ordinate values for $a_j$ with $j > k$ for some $k < N$ as depicted in FIG. 11.

We now define a perturbed function as:

$$g_\varepsilon(x) = \sum_{i=k}^{N} U_i(x, \varepsilon_i) \quad (37)$$

We define the perturbed function this way, because we intend to change the beta values by small amounts, i.e. by the epsilon values.

For some $1 < k < N$, where the $U_i(x, \varepsilon_i)$ are perturbed, compactly-supported linear segments:

$$U_i(x, \varepsilon_i) = \begin{cases} \left(\frac{(\beta_{i+1} + \varepsilon_{i+1}) - (\beta_i + \varepsilon_i)}{a_{i+1} - a_i}\right)(x - a_i) + (\beta_i + \varepsilon_i) & \text{for } x \in [a_i, a_{i+1}] \\ 0 & \text{otherwise} \end{cases} \quad (38)$$

Here, k represents the index value of the a value immediately before the a values corresponding to the beta values that we are going to change, see FIG. 11. We pick an index k, past which we adjust the beta parameters.

We then take $\varepsilon_k=0$ so that $(a_k, \beta_k + \varepsilon_k) = (a_k, \beta_k)$ thus leaving the point at index k fixed, maintaining a continuous function. Unity c.d.f and constant power constraints must still be satisfied for the perturbed solution; these are examined next.

1.8.1 Unity C.D.F. Constraint

From the unity c.d.f. condition on $g_\varepsilon(x)$, we have:

$$1 = \int_0^A g_\varepsilon(x) \, dx = \int_0^{a_k} f_R(x) \, dx + \int_{a_k}^A g_\varepsilon(x) \, dx$$

which gives:

$$\int_{a_k}^A g_\varepsilon(x) \, dx = 1 - \int_0^{a_k} f_R(x) \, dx \quad (39)$$

From integration of the Rayleigh distribution in (16), we obtain:

$$\int_{a_k}^A g_\varepsilon(x) \, dx = 1 - \left[1 - e^{-\frac{a_k^2}{\sigma^2}}\right] = e^{-\frac{a_k^2}{\sigma^2}}$$

Now from (37):

$$\int_{a_k}^A g_\varepsilon(x) \, dx = \int_{a_k}^A \sum_{i=k}^{N} U_i(x, \varepsilon_i) \, dx =$$

$$\sum_{i=k}^{N} \int_{a_k}^A U_i(x, \varepsilon_i) \, dx = \sum_{i=k}^{N} \int_{a_i}^{a_{i+1}} U_i(x, \varepsilon_i) \, dx = \sum_{i=k}^{N} \int_{a_i}^{a_{i+1}} m_i x + b_i \, dx$$

Where:

$$m_i = \frac{(\beta_{i+1} - \beta_i) + (\varepsilon_{i+1} - \varepsilon_i)}{a_{i+1} - a_i}$$

$$b_i = \beta_i + \varepsilon_i - \frac{a_i[(\beta_{i+1} - \beta_i) + (\varepsilon_{i+1} - \varepsilon_i)]}{a_{i+1} - a_i}.$$

Thus:

$$\sum_{i=k}^{N} \int_{a_i}^{a_{i+1}} m_i x + b_i \, dx =$$

$$\sum_{i=k}^{N} m_i \frac{x^2}{2} + b_i x \Big|_{a_i}^{a_{i+1}} = \sum_{i=k}^{N} m_i \left(\frac{a_{i+1}^2}{2} - \frac{a_i^2}{2}\right) + b_i(a_{i+1} - a_i)$$

Which, after much simplification, gives:

$$\int_{a_k}^A g_\varepsilon(x) \, dx = \sum_{i=k}^{N} T_i^1 \beta_i + T_i^2 \beta_{i+1} + \varepsilon_i \left(\frac{a_{i+1} - a_i}{2}\right) + \varepsilon_{i+1} \left(\frac{a_{i+1} - a_i}{2}\right) \quad (40)$$

for $T_i^1$ and $T_i^2$ defined in (26) and (27).

Hence from (39) and (40) we get:

$$\sum_{i=k}^{N} \varepsilon_i \left( \frac{a_{i+1} - a_i}{2} \right) + \varepsilon_{i+1} \left( \frac{a_{i+1} - a_i}{2} \right) = \quad (41)$$

$$1 - \int_0^{a_k} f_R(x) dx - \sum_{i=k}^{N} T_i^1 \beta_i + T_i^2 \beta_{i+1}$$

1.8.2 Constant Power Constraint

In general, we want to keep the average power level the same as for the original, uncompanded OFDM signal, while simultaneously reducing the peak power, so as to lower the PAPR value of the companded OFDM signal relative to the nominal OFDM signal, so a constant power constraint is used.

From the constant power constraint on $g_\epsilon(x)$, we have:

$$\sigma^2 = \int_0^A x^2 g_\varepsilon(x) dx = \int_0^{a_k} x^2 f_R(x) dx + \int_{a_k}^A x^2 g_\varepsilon(x) dx$$

which gives:

$$\int_{a_k}^A x^2 g_\varepsilon(x) dx = \sigma^2 - \int_0^{a_k} x^2 f_R(x) dx \quad (42)$$

Using integration by parts, we get:

$$\int_c^d x^2 f_R(x) dx = (c^2 + \sigma^2) e^{-\frac{c^2}{\sigma^2}} - (d^2 + \sigma^2) e^{-\frac{d^2}{\sigma^2}}$$

and so:

$$\int_0^{a_k} x^2 f_R(x) dx = \sigma^2 - (a_k^2 + \sigma^2) e^{-\frac{a_k^2}{\sigma^2}}$$

from which follows, using (42):

$$\int_{a_k}^A x^2 g_\varepsilon(x) dx = (a_k^2 + \sigma^2) e^{-\frac{a_k^2}{\sigma^2}}$$

Now:

$$\int_{a_k}^A x^2 g_\varepsilon(x) dx = \int_{a_k}^A x^2 \sum_{i=k}^N U_i(x, \varepsilon_i) dx = \sum_{i=k}^N \int_{a_k}^A x^2 U_i(x, \varepsilon_i) dx =$$

$$\sum_{i=k}^N \int_{a_i}^{a_{i+1}} x^2 U_i(x, \varepsilon_i) dx = \sum_{i=k}^N \int_{a_i}^{a_{i+1}} x^2 (m_i x + b_i) dx$$

Which, after much manipulation, becomes:

$$\int_{a_k}^A x^2 g_\varepsilon(x) dx = \sum_{i=k}^N W_i^1 \beta_i + W_i^2 \beta_{i+1} + \varepsilon_i \eta_i^1 + \varepsilon_{i+1} \eta_i^2 \quad (43)$$

Where:

$$\eta_i^1 = \frac{a_{i+1}^3 - a_i^3}{3} - \frac{a_{i+1}^4 - a_i^4}{4(a_{i+1} - a_i)} + \frac{a_i(a_{i+1}^3 - a_i^3)}{3(a_{i+1} - a_i)} = W_i^1$$

$$\eta_i^2 = \frac{a_{i+1}^4 - a_i^4}{4(a_{i+1} - a_i)} - \frac{a_i(a_{i+1}^3 - a_i^3)}{3(a_{i+1} - a_i)} = W_i^2.$$

From (43) using (42), we get:

$$\sum_{i=k}^N \varepsilon_i \eta_i^1 + \varepsilon_{i+1} \eta_i^2 = \sigma^2 - \int_0^{a_k} x^2 f_R(x) dx - \sum_{i=k}^N W_i^1 \beta_i + W_i^2 \beta_{i+1} \quad (44)$$

Combining (41) and (44), we get the under-constrained system of equations:

$$\sum_{i=k}^N \xi_i \varepsilon_i + \xi_i \varepsilon_{i+1} = C_1 \quad (45)$$

$$\sum_{i=k}^N \eta_i^1 \varepsilon_i + \eta_i^2 \varepsilon_{i+1} = C_2 \quad (46)$$

Where:

$$\xi_i = \frac{a_{i+1} - a_i}{2}$$

$$C_1 = 1 - \int_0^{a_k} f_R(x) dx - \sum_{i=k}^N T_i^1 \beta_i + T_i^2 \beta_{i+1}$$

$$C_2 = \sigma^2 - \int_0^{a_k} x^2 f_R(x) dx - \sum_{i=k}^N W_i^1 \beta_i + W_i^2 \beta_{i+1}.$$

Next, the optimal values of $\epsilon_i$ are found.

1.8.3 Optimal Perturbation Parameters

Our goal here is to find the minimal perturbation $g_\epsilon(x)$ away from $g(x)$. To do so, we'll choose parameters $(\epsilon_{k+1}, \ldots, \epsilon_N)$ to minimize:

$$F_\varepsilon(\varepsilon_{k+1}, \ldots, \varepsilon_{N+1}) = \sum_{i=k+1}^{N+1} \varepsilon_i^2 \quad (47)$$

First we rewrite (45) and (46) as:

$$C_1 = \sum_{i=k}^N \xi_i \varepsilon_i + \xi_i \varepsilon_{i+1} = \quad (48)$$

$$\xi_k \varepsilon_k + \left( \sum_{i=k+1}^{N-1} \xi_{i-1} \varepsilon_i + \xi_i \varepsilon_i \right) + (\xi_{N-1} \varepsilon_N + \xi_N \varepsilon_N) + \xi_N \varepsilon_{N+1} =$$

-continued $$\xi_k \varepsilon_k + \left(\sum_{i=k+1}^{N-1}(\xi_{i-1}+\xi_i)\varepsilon_i\right) + (\xi_{N-1}+\xi_N)\varepsilon_N + \xi_N \varepsilon_{N+1} =$$

$$\left(\sum_{i=k+1}^{N-1}(\xi_{i-1}+\xi_i)\varepsilon_i\right) + (\xi_{N-1}+\xi_N)\varepsilon_N + \xi_N \varepsilon_{N+1}$$

because, by definition, we took $\epsilon_k = 0$. Similarly from (46):

$$C_2 = \sum_{i=k}^{N} \eta_i^1 \varepsilon_i + \eta_i^2 \varepsilon_{i+1} = \tag{49}$$

$$\eta_k^1 \varepsilon_k + \left(\sum_{i=k+1}^{N-1} \eta_{i-1}^2 \varepsilon_i + \eta_i^1 \varepsilon_i\right) + (\eta_{N-1}^2 \varepsilon_N + \eta_N^1 \varepsilon_N) + \eta_N^2 \varepsilon_{N+1} =$$

$$\eta_k^1 \varepsilon_k + \left(\sum_{i=k+1}^{N-1}(\eta_{i-1}^2 + \eta_i^1)\varepsilon_i\right) + (\eta_{N-1}^2 + \eta_N^1)\varepsilon_N + \eta_N^2 \varepsilon_{N+1} =$$

$$\left(\sum_{i=k+1}^{N-1}(\eta_{i-1}^2 + \eta_i^1)\varepsilon_i\right) + (\eta_{N-1}^2 + \eta_N^1)\varepsilon_N + \eta_N^2 \varepsilon_{N+1}$$

Now we define functions:

$$h_1(\varepsilon_{k+1},\ldots,\varepsilon_{N+1}) = \left(\sum_{i=k+1}^{N-1}(\xi_{i-1}+\xi_i)\varepsilon_i\right) + (\xi_{N-1}+\xi_N)\varepsilon_N + \xi_N \varepsilon_{N+1} \tag{50}$$

$$h_2(\varepsilon_{k+1},\ldots,\varepsilon_{N+1}) = \left(\sum_{i=k+1}^{N-1}(\eta_{i-1}^2+\eta_i^1)\varepsilon_i\right) + (\eta_{N-1}^2+\eta_N^1)\varepsilon_N + \eta_N^2 \varepsilon_{N+1} \tag{51}$$

Then from (48) and (49) we get two constraint equations:

$$h_1(\epsilon_{k+1},\ldots,\epsilon_{N+1}) = C_1$$

$$h_2(\epsilon_{k+1},\ldots,\epsilon_{N+1}) = C_2$$

Next, we define the Lagrangian:

$$\Lambda_h(\epsilon_{k+1},\ldots,\epsilon_{N+1},\lambda_1,\lambda_2) = F_\epsilon(\epsilon_{k+1},\ldots,\epsilon_{N+1}) + \lambda_1[h_1(\epsilon_{k+1},\ldots,\epsilon_{N+1}) - C_1] + \lambda_2[h_2(\epsilon_{k+1},\ldots,\epsilon_{N+1}) - C_2]$$

Now, we solve the set of equations:

$$\frac{\partial \Lambda_h}{\partial \varepsilon_j} = 0 \tag{52}$$

$$\frac{\partial \Lambda_h}{\partial \lambda_1} = 0$$

$$\frac{\partial \Lambda_h}{\partial \lambda_2} = 0.$$

We have:

$$\frac{\partial \Lambda_h}{\partial \varepsilon_j} = \frac{\partial F_\varepsilon}{\partial \varepsilon_j} + \lambda_1 \frac{\partial h_1}{\partial \varepsilon_j} + \lambda_2 \frac{\partial h_2}{\partial \varepsilon_j}$$

$$\frac{\partial \Lambda_h}{\partial \lambda_1} = h_1(\varepsilon_{k+1},\ldots,\varepsilon_{N+1}) - C_1$$

$$\frac{\partial \Lambda_h}{\partial \lambda_2} = h_2(\varepsilon_{k+1},\ldots,\varepsilon_{N+1}) - C_2$$

From (47):

$$\frac{\partial F_\varepsilon}{\partial \varepsilon_j} = 2\varepsilon_j$$

From (50) and (51):

$$\frac{\partial h_1}{\partial \varepsilon_i} = \begin{cases} \xi_{i-1}+\xi_i & \text{if } k+1 \leq i \leq N \\ \xi_N & \text{if } i = N+1 \end{cases},$$

$$\frac{\partial h_2}{\partial \varepsilon_i} = \begin{cases} \eta_{i-1}^2+\eta_i^1 & \text{if } k+1 \leq i \leq N \\ \eta_N^2 & \text{if } i = N+1 \end{cases}$$

Thus:

$$\frac{\partial \Lambda_j}{\partial \varepsilon_j} = \begin{cases} 2\varepsilon_i + \lambda_1(\xi_{i-1}+\xi_i) + \lambda_2(\eta_{i-1}^2+\eta_i^1) & \text{if } k+1 \leq i \leq N \\ 2\varepsilon_{N+1} + \lambda_1(\xi_N) + \lambda_2(\eta_N^2) & \text{if } i = N+1 \end{cases}$$

Hence, we need to solve the following system of equations for $\epsilon_i$, $\lambda_1$, $\lambda_2$:

$$(\xi_k + \xi_{k+1})\lambda_1 + (\eta_k^2 + \eta_{k+1}^1)\lambda_2 + (2)\varepsilon_{k+1} = 0$$

$$\vdots$$

$$(\xi_{i-1} + \xi_i)\lambda_1 + (\eta_{i-1}^2 + \eta_i^1)\lambda_2 + (2)\varepsilon_i = 0$$

$$\vdots$$

$$(\xi_N)\lambda_1 + (\eta_N^2)\lambda_2 + (2)\varepsilon_{N+1} = 0$$

$$(0)\lambda_1 + (0)\lambda_2 + \left(\sum_{i=k+1}^{N-1}(\xi_{i-1}+\xi_i)\varepsilon_i\right) + (\xi_{N-1}+\xi_N)\varepsilon_N + \xi_N \varepsilon_{N+1} = C_1$$

$$(0)\lambda_1 + (0)\lambda_2 + \left(\sum_{i=k+1}^{N-1}(\eta_{i-1}^2+\eta_i^1)\varepsilon_i\right) + (\eta_{N-1}^2+\eta_N^1)\varepsilon_N + \eta_N^2 \varepsilon_{N+1} = C_2$$

Or:

$$\begin{pmatrix} (\xi_k+\xi_{k+1}) & (\eta_k^2+\eta_{k+1}^1) & 2 & 0 & & 0 \\ (\xi_{k+1}+\xi_{k+2}) & (\eta_{k+1}^2+\eta_{k+2}^1) & 0 & 2 & 0 & 0 \\ \vdots & \vdots & & & \ddots & \\ & & & & & \ddots \\ (\xi_{i+1}+\xi_i) & (\eta_{i+1}^2+\eta_i^1) & 0 & & 2 & 0 & 0 \\ \vdots & \vdots & & & & \ddots \\ \xi_N & \eta_N^2 & 0 & & & 0 & 2 \\ 0 & 0 & (\xi_k+\xi_{k+1}) & \cdots & & & \xi_N \\ 0 & 0 & (\eta_k^2+\eta_{k+1}^1) & \cdots & & & \eta_N^2 \end{pmatrix} \tag{53}$$

-continued $$\begin{pmatrix} \lambda_1 \\ \lambda_2 \\ \vdots \\ \varepsilon_i \\ \vdots \\ \varepsilon_{N-1} \\ \varepsilon_N \\ \varepsilon_{N+1} \end{pmatrix} = \begin{pmatrix} 0 \\ 0 \\ \vdots \\ \vdots \\ C_1 \\ C_2 \end{pmatrix}$$

This system of equations (53) may then be solved numerically.

1.9. Perturbed Solution Numerical Results

Perturbation solutions for the system in (53) are shown for $A=1.4$ and $k \in \{5,6,7,8\}$ in FIGS. 12 through 15. In these Figures, the perturbation solution with the Rayleigh front-end is plotted against the optimal solution.

1.10. Compander Derivation

Next, we denote the companding function by C, which operates on the input sequence $x(n)$ by modifying the amplitude to produce the companded output sequence $y(n) = C\{x(n)\}$. The compander is monotonic, i.e. it maintains order of the function (i.e., either increasing or decreasing), over its domain $x \in [0,A]$, so the compander may be derived as:

$$C\{x(n)\} = \text{sgn}\{x(n)\} F_{|y|}^{-1} F_{|x|}\{x(n)\} \qquad (54)$$

Where $F_{|x|}$ denotes the c.d.f of the input and $F_{|y|}$ denotes the c.d.f of the output companded signal. To derive the compander, expressions for each c.d.f in (54) are needed. The p.d.f. of the companded signal is given by:

$$f_{|y|}(x) = \begin{cases} \frac{2x}{\sigma^2} e^{-\frac{x^2}{\sigma^2}} & \text{for } 0 \le x < a_1 \\ f_{a_1}(x) & \text{for } a_1 \le x < a_2 \\ \vdots & \vdots \\ f_{a_i}(x) & \text{for } a_i \le x < a_{i+1} \\ \vdots & \vdots \\ f_{a_N}(x) & \text{for } a_N \le x < a_{N+1} \\ 0 & \text{for } a_{N+1} \le x \end{cases}$$

For $a_i \le x < a_{i+1}$, the c.d.f. is given by:

$$F_{|y|}(x) = \qquad (55)$$

$$\int_0^x f_{|y|}(\xi) d\xi = \left[ \int_0^{a_1} f_R(\xi) d\xi + \sum_{j=1}^{i-1} \int_{a_j}^{a_{j+1}} f_{a_j}(\xi) d\xi \right] + \int_{a_i}^x f_{a_i}(\xi) d\xi$$

$$= Z_{i-1} + \int_{a_i}^x f_{a_i}(\xi) d\xi \qquad (56)$$

Where $Z_{i-1}$ denotes the term in brackets. Thus:

$$F_{|y|}(x) - Z_{i-1} = \qquad (57)$$

$$\int_0^x f_{a_i}(\xi) d\xi = \int_{a_i}^x m_i \xi + b_i d\xi = m_i \frac{x^2}{2} + b_i x - m_i \frac{a_i^2}{2} - b_i a_i =$$

$$\left(\frac{m_i}{2}\right) x^2 + (b_i) x + \left[ -\left( m_i \frac{a_i^2}{2} + b_i a_i \right) \right] = (\gamma) x^2 + (\delta) x + e$$

with the obvious definitions for $\gamma$, $\delta$, $e$, i.e. they correspond to the coefficients of the x times x term, the x term, and the constant term. Now, $\gamma$ might be negative, so divide both sides of (57) by $\gamma$ to get:

$$\frac{F_{|y|}(x) - Z_{i-1}}{\gamma} = x^2 + \left(\frac{\delta}{\gamma}\right) x + \left(\frac{e}{\gamma}\right) \qquad (58)$$

Complete the square in (58):

$$\left( x + \frac{\delta}{2\gamma} \right)^2 = x^2 + \frac{2\delta}{2\gamma} x + \frac{\delta^2}{4\gamma^2} = x^2 + \left(\frac{\delta}{\gamma}\right) x + \left(\frac{\delta^2}{4\gamma^2}\right)$$

Which implies:

$$\left( x + \frac{\delta}{2\gamma} \right)^2 + \left( \frac{e}{\gamma} - \frac{\delta^2}{4\gamma^2} \right) = \qquad (59)$$

$$x^2 + \left(\frac{\delta}{\gamma}\right) x + \frac{\delta^2}{4\gamma^2} + \left( \frac{e}{\gamma} - \frac{\delta^2}{4\gamma^2} \right) = x^2 + \left(\frac{\delta}{\gamma}\right) x + \left(\frac{e}{\gamma}\right)$$

Using (59), (58) becomes:

$$\frac{F_{|y|}(x) - Z_{i-1}}{\gamma} = \left( x + \frac{\delta}{2\gamma} \right)^2 + \left( \frac{e}{\gamma} - \frac{\delta^2}{4\gamma^2} \right) \qquad (60)$$

$$\Rightarrow$$

$$\left( x + \frac{\delta}{2\gamma} \right)^2 = \frac{F_{|y|}(x) - Z_{i-1}}{\gamma} - \left( \frac{e}{\gamma} - \frac{\delta^2}{4\gamma^2} \right)$$

$$\Rightarrow$$

$$x + \frac{\delta}{\gamma^2} = \pm \sqrt{ \frac{F_{|y|}(x) - Z_{i-1}}{\gamma} - \left( \frac{e}{\gamma} - \frac{\delta^2}{4\gamma^2} \right) }$$

(The above arrows are mathematical shorthand for the phrase: "which implies")

And thus:

$$x = \pm \sqrt{ \frac{F_{|y|}(x) - Z_{i-1}}{\gamma} - \left( \frac{e}{\gamma} - \frac{\delta^2}{4\gamma^2} \right) } - \frac{\delta}{2\gamma} \qquad (61)$$

In (61) we need to decide whether to take the positive or negative square-root. The decision is made from (60) by examining the sign of $$x + \frac{\delta}{2\gamma}.$$

If positive, the positive square-root is chosen, if negative, the negative square-root should be chosen. Of course, if $x \ge A$, then we consider the sign on $$A + \frac{\delta}{2\gamma}.$$

Finally, the compander is given by:

$$F_{|y|}^{-1} F_R(x) = \pm \sqrt{\frac{1 - e^{-\frac{x^2}{\sigma^2}} - Z_{i-1}}{\gamma} - \left(\frac{e}{\gamma} - \frac{\delta^2}{4\gamma^2}\right)} - \frac{\delta}{2\gamma} \quad (62)$$

for $a_i \leq x < a_{i+1}$. To complete the compander derivation, we need to calculate $Z_i$. From (16) and (55):

$$Z_0 = \int_0^{a_1} f_R(\xi) d\xi = 1 - e^{-\frac{a_1^2}{\sigma^2}}$$

For $i > 0$, $Z_i$ contains integral terms of the form:

$$\int_{a_j}^{a_{j+1}} f_{a_j}(\xi) d\xi$$

which represents a trapezoidal area and can be shown to be:

$$\int_{a_j}^{a_{j+1}} f_{a_j}(\xi) d\xi = \frac{\beta_{i+1}(a_{i+1} - a_i) + \beta_i(a_{i+1} - a_i)}{2}$$

Hence:

$$Z_i = Z_{i-1} + \frac{\beta_{i+1}(a_{i+1} - a_i) + \beta_i(a_{i+1} - a_i)}{2} \quad (63)$$

1.11 Decompander Derivation

To find the decompander, we need to invert (62):

$$y = \pm \sqrt{\frac{1 - e^{-\frac{x^2}{\sigma^2}} - Z_{i-1}}{\gamma} - \left(\frac{e}{\gamma} - \frac{\delta^2}{4\gamma^2}\right)} - \frac{\delta}{2\gamma} \quad (63)$$

$$\Rightarrow$$

$$\left(y + \frac{\delta}{2\gamma}\right)^2 = \frac{1 - e^{-\frac{x^2}{\sigma^2}} - Z_{i-1}}{\gamma} - \left(\frac{e}{\gamma} - \frac{\delta^2}{4\gamma^2}\right)$$

$$\Rightarrow$$

$$\gamma\left(y + \frac{\delta}{2\gamma}\right)^2 = 1 - e^{-\frac{x^2}{\sigma^2}} - Z_{i-1} - e + \frac{\delta^2}{4\gamma}$$

$$\Rightarrow$$

$$e^{-\frac{x^2}{\sigma^2}} - \gamma\left(y + \frac{\delta}{2\gamma}\right)^2 - e + \frac{\delta^2}{4\gamma} + 1 - Z_{i-1}$$

$$\Rightarrow$$

$$x = \text{sgn}(x) \sqrt{-\sigma^2 \ln\left(-\gamma\left(y + \frac{\delta}{2\gamma}\right)^2 - e + \frac{\delta^2}{4\gamma} + 1 - Z_{i-1}\right)} \quad (64)$$

Note that, in (64), the sgn function refers to retaining either the positive or negative square-root, depending on the sign of X.

Finally, we need to find the range of the compander for use in the decompander. When $a_i \leq x < a_{i+1}$, then $y_{MIN} \leq y < y_{MAX}$ where:

$$y_{MIN} = \min\{y(a_i), y(a_{i+1})\}$$

$$y_{MAX} = \max\{y(a_i), y(a_{i+1})\}$$

and from (63):

$$y(a_i) = \pm \sqrt{\frac{1 - e^{-\frac{a_i^2}{\sigma^2}} - Z_{i-1}}{\gamma} - \left(\frac{e}{\gamma} - \frac{\delta^2}{4\gamma^2}\right)} - \frac{\delta}{2\gamma}$$

$$y(a_{i+1}) = \pm \sqrt{\frac{1 - e^{-\frac{a_{i+1}^2}{\sigma^2}} - Z_{i-1}}{\gamma} - \left(\frac{e}{\gamma} - \frac{\delta^2}{4\gamma^2}\right)} - \frac{\delta}{2\gamma}$$

2. SIMULATION

Simulation results were generated for a Quadrature Phase Shift Keying (QPSK) (a type of phase shift keying) modulated OFDM signal with sixty four subcarriers over an additive white Gaussian noise channel. Ten thousand realizations of signal-plus-noise were generated for each noise power.

For the Rayleigh p.d.f., $\sigma = \sqrt{2}/2$ was chosen. An oversampling factor of four was used so that the discrete PAPR reasonably approximates the PAPR from a continuous system as is described Y. Wang, L.-H. Wang, J.-H. Ge, and B. Ai., "An Efficient Nonlinear Companding Transform for Reducing PAPR of OFDM Signals", *IEEE Trans. Broadcast.*, vol. 58, no. 4, pp.: 677-684, December 2012. PAPR reduction was measured using the complimentary cumulative distribution function (CCDF), which gives the probability that the PAPR is above a given threshold value. Symbol error rates, to measure demodulation performance, and power spectrums, to measure out-of-band power reduction, were also generated.

Lagrange compander results were then generated and compared against two state-of-the-art companders; the linear compander (LIN) in Y. Wang, L.-H. Wang, J.-H. Ge, and B. Ai., "An Efficient Nonlinear Companding Transform for Reducing PAPR of OFDM Signals", *IEEE Trans. Broadcast.*, vol. 58, no. 4, pp.: 677-684, December 2012, and the two-component, pieceweise linear compander (LIN2) in Y. Wang, J.-H. Ge, L.-H. Wang, J. Li, and B. Ai., "Nonlinear Companding Transform for Reduction of Peak-to-Average Power ratio in OFDM Systems", *IEEE Trans. Broadcast.*, vol. 59, no. 2, pp.: 369-375, June 2013. The LIN compander was state-of-the-art as of December 2012. The LIN compander was improved to create the LIN2 compander. A cutoff value of A=1.6281 was chosen, as this appears to be the maximum cutoff value obtainable with the LIN2 compander. The LIN compander can attain a maximum cutoff value of about A=1.44, and this value was used for the LIN compander results. Therefore the Lagrange compander solution can provide higher cutoff values than can be obtained with the LIN and LIN2 solutions, thereby providing additional compander design flexibility. Two Lagrange companders were used; the optimal solution (LG) with a perturbed $a_1 > 0$ to generate a non-negative solution, and the epsilon-perturbed compander (EP), which takes the optimal Lagrange compander and perturbs the tail using optimal perturbation values. For each plot, the curve labels have the following meaning: LG=optimal Lagrange, EP=epsilon-perturbed Lagrange, LW=LIN2, WG=LIN.

Figure 16:
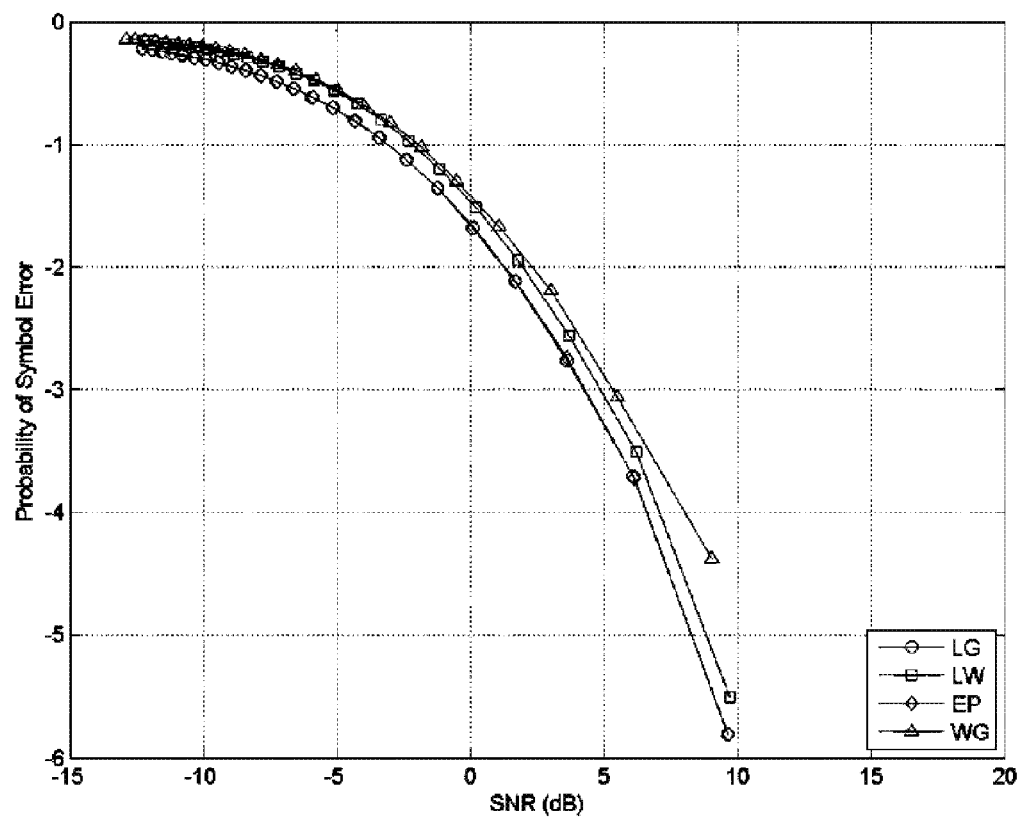
FIG. 16 is a graph showing symbol error rate performance.

FIG. 16 contains symbol error plots for the four companders. FIG. 16 shows that the LG and EP companders provide an improvement in symbol error rate performance over the LIN and LIN2 companders.

Figure 17:
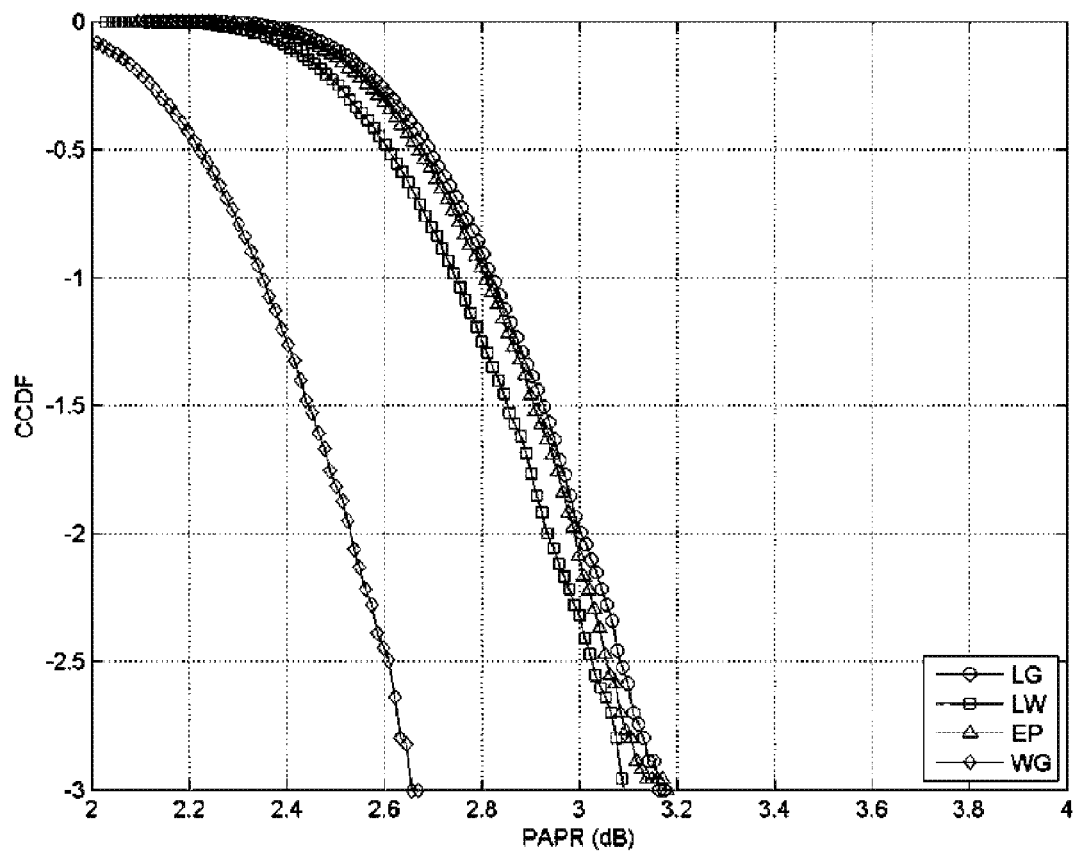
FIG. 17 is a graph showing PAPR reduction performance.

This improvement in symbol error rate comes at the cost of a small reduction in PAPR performance relative to the LIN2 approach, shown in FIG. 17 which contains the CCDF results. The LIN approach, under the present scenario, gives the best performance due to the significantly reduced cutoff value, A=1.44 versus A=1.6281.

Figure 18:
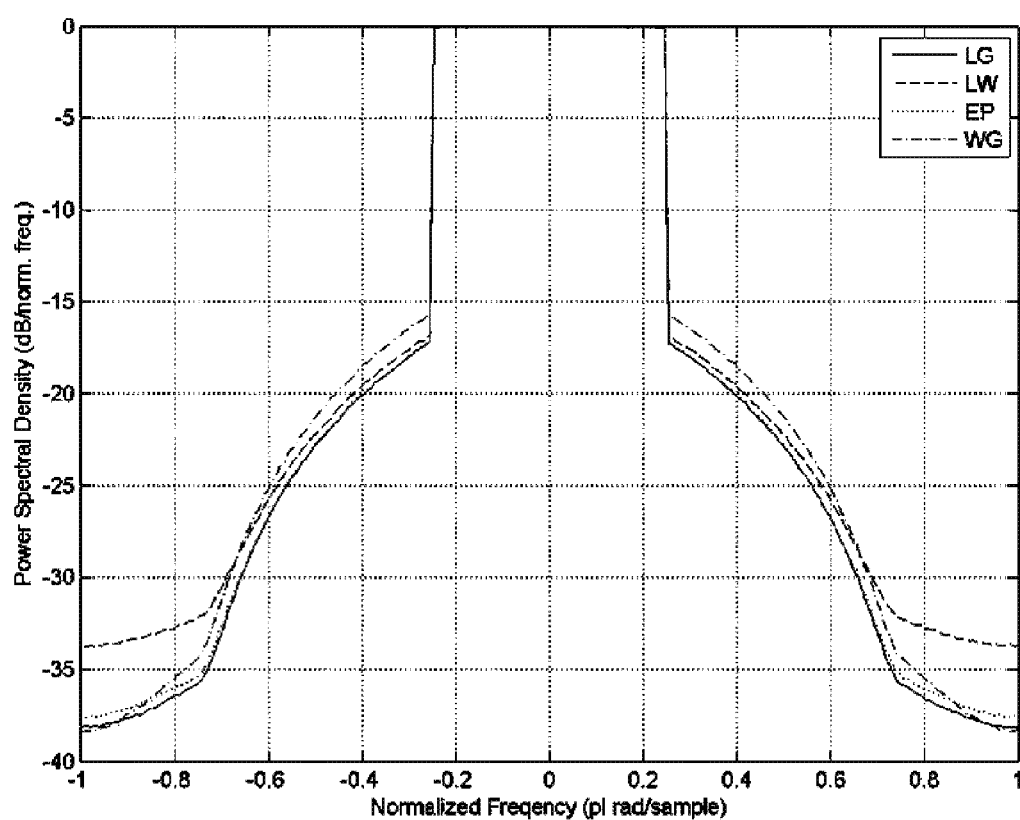
FIG. 18 is a graph showing out-of-band power rejection.

The Lagrange companders, however, provide a small performance improvement in out-of-band power rejection over the LIN2 and a significant performance advantage over the LIN approach (FIG. 18). The Lagrange approach shows an improvement of about 0.4 dB over the LIN2 approach and over 1.0 dB in out-of-band power rejection over the LIN approach.

Figure 19:
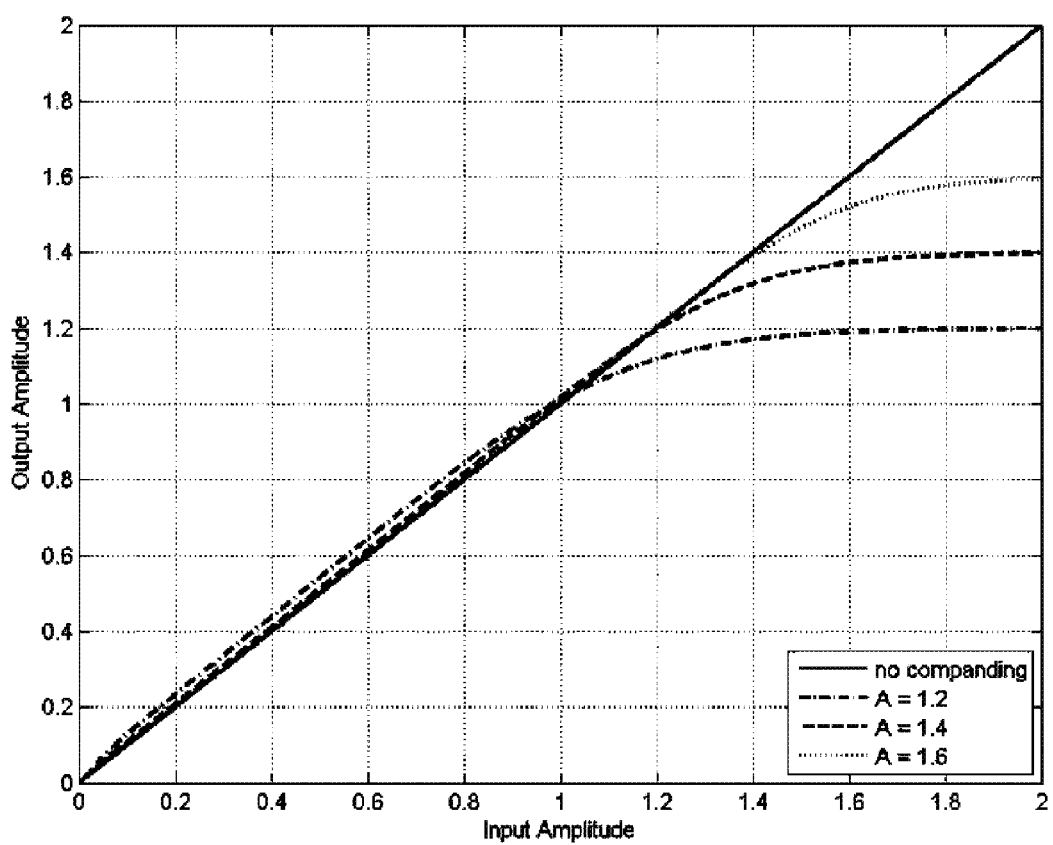
FIG. 19 is a graph showing sample Lagrange Companders.

Sample Lagrange companders, for different cutoff values, are shown in FIG. 19.

3. CONCLUSION

Those skilled in the art will appreciate that we have developed a family of companders for PAPR reduction in OFDM signals using a constrained optimization approach. We derived companders and decompanders and demonstrated that the new companders can provide performance improvements over current state-of-the art solutions. The new companders can also provide solutions over ranges of the cutoff values where the current state-of-the-art companders fail to exist. The set of companders developed in this paper increase the solution set of companders to tradeoff between demodulation performance, PAPR reduction, and out-of-band power rejection.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A signal transmitting apparatus for an orthogonal frequency division multiplexing (OFDM) system, comprising:
a receiver, configured to receive and expand an orthogonal frequency-divided multiplexed signal in accordance with a dynamic range function;
and a transmitter in communication with said receiver configured to compress the expanded orthogonal frequency-divided multiplexed signal and transmit the resulting compressed signal;
wherein said receiver and said transmitter together comprise a compander and said dynamic range function comprises a conversion of a Rayleigh amplitude distribution, said Rayleigh amplitude distribution comprising a plurality of Rayleigh distributed signal amplitude values, to a piecewise linear distribution which optimally matches the Rayleigh amplitude distribution up to a cutoff amplitude value, and wherein said piecewise linear distribution is determined by defining and solving a constrained optimization problem using Lagrange multipliers.

2. A method of companding an orthogonal frequency division multiplexed signal comprising:
receiving and expanding an orthogonal frequency-divided multiplexed signal comprising a sufficiently large number of tones to form a Gaussian distributed signal, wherein components of said Gaussian distributed signal generate Rayleigh distributed signal amplitude values, wherein said Rayleigh distributed signal amplitude values comprise a Rayleigh amplitude distribution;
converting said Rayleigh amplitude distribution to a piecewise linear distribution which optimally matches the Rayleigh amplitude distribution up to a cutoff amplitude value, and wherein said piecewise linear distribution is determined by defining and solving a constrained optimization problem using Lagrange multipliers;
compressing the expanded orthogonal frequency-divided multiplexed signal using said constrained optimization problem; and
transmitting the resulting compressed signal.

3. The method of claim 2 wherein said Rayleigh amplitude distribution is decomposed into disjoint regions over which a plurality of amplitude weighting functions are used.

4. The method of claim 2 wherein said constrained optimization approach comprises optimizing an objective function with respect to changeable elements in the presence of constraints on those elements.

5. The method of claim 4 wherein said Rayleigh amplitude distribution is a probability distribution function and a first said constraint is that said Rayleigh amplitude distribution must integrate to unity.

6. The method of claim 4 wherein a second said constraint is that power must be constant across the distribution.

7. The method of claim 4 wherein an optimal solution is minimally perturbed to generate only non-negative solutions.

8. The method of claim 4 wherein said Rayleigh amplitude distribution is defined as:

$$f_R(x) = \frac{2x}{\sigma^2} e^{-\frac{x^2}{\sigma^2}}.$$

9. The method of claim 8 wherein further comprising determining a function g(x) which minimizes:

$$\int_0^A (f_R(x) - g(x))^2 \, dx.$$

10. The method of claim 9 wherein g(x) is chosen to be of piecewise linear form.

11. The method of claim 10 wherein g(x) is defined as $$g(x) = \sum_{i=1}^N U_i(x).$$

12. The method of claim 2 wherein the dynamics of the system are defined as:

$$\Lambda(\beta_1, \ldots \beta_{N+1}, \lambda_1, \lambda_2) = F(\beta_1, \ldots \beta_{N+1}) + \lambda_1[g_1(\beta_1, \ldots \beta_{N+1}) - 1] + \lambda_2[g_2(\beta_1, \ldots \beta_{N+1}) - \sigma^2].$$

13. The method of claim 12 wherein a first constraint, that the cumulative distribution function must integrate to unity, is expressed as: $g_1(\beta_1, \ldots \beta_{N+1}) = 1$.

14. The method of claim 12 wherein a second constraint, that power must be constant, is expressed as: $g_2(\beta_1, \ldots \beta_{N+1}) = \sigma^2$.

15. The method of claim 2 wherein said constrained optimization problem can be defined as:
Minimize:

$$F(\beta_1, \ldots B_{N+1}) = \int_0^A (f_R(x) - g(x))^2 dx$$

for $\beta_i$, subject to $$\int_0^A g(x)dx = 1 \text{ and}$$

$$\int_0^A x^2 g(x) dx = \int_0^\infty x^2 f_R(x) dx = \sigma^2,$$

using Lagrange multipliers.

16. The method of claim 2 wherein said compander is defined as:

$$F_{|y|}^{-1} F_R(x) = \pm\sqrt{\frac{1 - e^{-\frac{x^2}{\sigma^2}} - Z_{i-1}}{\gamma} - \left(\frac{e}{\gamma} - \frac{\delta^2}{4\gamma^2}\right)} - \frac{\delta}{2\gamma}$$

for $a_i \leq x < a_{i+1}$, wherein $$Z_i = Z_{i-1} + \frac{\beta_{i+1}(a_{i+1} - a_i) + \beta_i(a_{i+1} - a_i)}{2}.$$

17. The method of claim 16 wherein a decompander for use with said compander is defined as:

$$x = \text{sgn}(x)\sqrt{-\sigma^2 \ln\left(-\gamma\left(y + \frac{\delta}{2\gamma}\right)^2 - e + \frac{\delta^2}{4\gamma} + 1 - Z_{i-1}\right)},$$

where the sgn function refers to retaining either the positive or negative square-root, depending on the sign of x; and
wherein the range of said compander can be defined as, when $a_i \leq x < a_{i+1}$, then $y_{MIN} \leq y < y_{MAX}$ where: $y_{MIN} = \min\{y(a_i), y(a_{i+1})\}$, $y_{MAX} = \max\{y(a_i), y(a_{i+1})\}$, subject to $$y(a_i) = \pm\sqrt{\frac{1 - e^{-\frac{a_i^2}{\sigma^2}} - Z_{i-1}}{\gamma} - \left(\frac{e}{\gamma} - \frac{\delta^2}{4\gamma^2}\right)} - \frac{\delta}{2\gamma}$$

and $$y(a_{i+1}) = \pm\sqrt{\frac{1 - e^{-\frac{a_{i+1}^2}{\sigma^2}} - Z_{i-1}}{\gamma} - \left(\frac{e}{\gamma} - \frac{\delta^2}{4\gamma^2}\right)} - \frac{\delta}{2\gamma}.$$

18. The method of claim 17 wherein a Hessian Matrix is used to determine critical point types.

* * * * *